United States Patent
Sano et al.

(10) Patent No.: US 8,780,683 B2
(45) Date of Patent: Jul. 15, 2014

(54) INFORMATION RECORDING MEDIUM, TRACKING METHOD, AND OPTICAL INFORMATION APPARATUS

(75) Inventors: Kousei Sano, Osaka (JP); Tatsuya Takaoka, Osaka (JP); Hidenori Wada, Kyoto (JP); Keiichi Matsuzaki, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/007,176

(22) PCT Filed: Apr. 9, 2012

(86) PCT No.: PCT/JP2012/002473
§ 371 (c)(1),
(2), (4) Date: Sep. 24, 2013

(87) PCT Pub. No.: WO2012/140867
PCT Pub. Date: Oct. 18, 2012

(65) Prior Publication Data
US 2014/0022882 A1  Jan. 23, 2014

(30) Foreign Application Priority Data

Apr. 11, 2011 (JP) .................................. 2011-087022

(51) Int. Cl.
*G11B 7/00* (2006.01)
(52) U.S. Cl.
USPC .................. 369/275.3; 369/275.4; 369/44.26; 369/44.28; 369/44.39
(58) Field of Classification Search
None
See application file for complete search history.

(56) References Cited

U.S. PATENT DOCUMENTS

| | | | |
|---|---|---|---|
| 6,738,342 B2* | 5/2004 | Furumiya et al. | 369/275.4 |
| 2002/0181351 A1* | 12/2002 | Ueda et al. | 369/44.34 |
| 2007/0242593 A1* | 10/2007 | Coene | 369/124.02 |
| 2009/0310446 A1 | 12/2009 | Nakaoki et al. | |

FOREIGN PATENT DOCUMENTS

| | | |
|---|---|---|
| JP | 53-82220 | 7/1978 |
| JP | 59-38939 | 3/1984 |
| JP | 63-63182 | 3/1988 |

(Continued)

OTHER PUBLICATIONS

International Search Report issued May 22, 2012 in International (PCT) Application No. PCT/JP2012/002473.

(Continued)

*Primary Examiner* — Muhammad N Edun
(74) *Attorney, Agent, or Firm* — Wenderoth, Lind & Ponack, L.L.P.

(57) ABSTRACT

An optical disc (120) has a first mark (131) disposed at the center of a track, a second mark (132) disposed away from the center of the track in a tracking direction thereof by a distance b1, and disposed away from the first mark (131) in the direction along the track by a distance L, and a third mark (133) disposed away from the center of the track in the tracking direction opposite to that of the second mark (132) by a distance b2, and disposed away from the first mark (131) in the direction along the track by a distance L2. The second and third marks (132) and (133) generate scattered light depending on the distance between a scattering medium (103) and each of the marks by irradiating the scattering medium (103) in an optical information apparatus with light. The distances b1 and b2 are smaller than 50 nm.

14 Claims, 22 Drawing Sheets

(56) References Cited

FOREIGN PATENT DOCUMENTS

| | | |
|---|---|---|
| JP | 9-22538 | 1/1997 |
| JP | 10-320942 | 12/1998 |
| JP | 2001-250260 | 9/2001 |
| JP | 2002-109789 | 4/2002 |
| JP | 2006-172613 | 6/2006 |
| JP | 2010-20879 | 1/2010 |

OTHER PUBLICATIONS

Linda Gunnarsson et al., "Confined Plasmons in Nanofabricated Single Silver Particle Pairs: Experimental Observations of Strong Interparticle Interactions", J. Phys. Chern. B, 2005, 109, 1079-1087.

* cited by examiner

TRACKS

TRACKS

INFORMATION RECORDING MEDIUM, TRACKING METHOD, AND OPTICAL INFORMATION APPARATUS

TECHNICAL FIELD

The present invention relates to information recording media having tracks, a tracking method for tracking the information recording media, and an optical information apparatus configured to record or reproduce information to or from the information recording media. The present invention more particularly relates to information recording media, a tracking method, and an optical information apparatus configured such that tracking is performed with respect to a track having a track pitch narrower than the diffraction limit of light, with use of a scattering medium or a like member of a size smaller than the wavelength of light.

BACKGROUND ART

Conventionally, there has been known an optical disc having pre-wobbled pits, as an information recording medium to or from which information is recorded or reproduced, with use of a diffraction limited light spot formed by collecting beams of light on a lens (see e.g. patent literature 1). FIG. 40 is a diagram showing an example of pre-wobbled pits in a conventional information recoding medium disclosed in patent literature 1.

Referring to FIG. 40, the following method is known. Pits 901 are wobbled and formed in grooves 902, and in gap portions between the grooves 902 adjacent to each other. A synchronization signal is generated by the pits 901 in an area 903. The synchronization signal is compared with a reproduction signal to be output at a timing corresponding to the pre-wobbled pits 901 within an area 904 for checking the center of the track. Then, for instance, an offset of a tracking signal to be obtained from the grooves 902 is corrected. Information is recorded in an area 905 and thereafter. Further, a plurality of the areas 904 each having the pre-wobbled pits 901 are formed in the periphery of the optical disc. Information in the areas 904 is sampled and held, and used as a tracking signal.

The above conventional technology employs a phenomenon that the reflection efficiency varies depending on a positional relationship between a light spot and a pit, when the light spot passes pits each having a predetermined depth, or pits having depths different from each other. A change in the light amount of light that returns as reflected light is read as a reproduction signal. A light spot is formed by collecting light emitted from a laser light source on an objective lens up to the diffraction limit. The size of the light spot is determined based on the wavelength $\lambda$ of light and the numerical aperture NA, and is about $\lambda/(2\,NA)$. For instance, in the case where $\lambda=410$ nm and NA=0.85, the size of the light spot is about 0.24 μm. In an information recording medium using such a light spot, the track pitch Tp is set to about 0.32 μm, the size (diameter) of a wobble pit is set to about 0.24 μm, which is substantially equal to the size of a light spot, and the wobbling amount is set to about Tp/4 (0.08 μm), for instance.

However, in a conventional configuration, the size of a light spot is restricted by the diffraction limit that is determined based on the wavelength of light and the numerical aperture. In order to reduce the light spot for the purpose of enhancing the recording density of information, it is necessary to shorten the wavelength of light or to increase the numerical aperture. Light of an extremely short wavelength is ultraviolet light. Therefore, it is difficult to implement a light source, the material of optical components is limited, and it is impossible to use the optical components with ease. It is true that the numerical aperture larger than one can be implemented, with use of SIL (Solid Immersion Lens) or a like member. However, the numerical aperture is multiplied only by a multiple substantially as large as about a refractive index. Therefore, there is a limit on the size of the numerical aperture.

As described above, it has been difficult to reduce the size of wobble pits, and it has been impossible to utilize the wobble pits, as means for detecting a tracking signal in a higher-density information recording medium.

CITATION LIST

Patent Literature

Patent literature 1: JP Sho 59-38939A

SUMMARY OF INVENTION

In view of the above, an object of the invention is to provide information recording media, a tracking method, and an optical information apparatus that enable to stably perform tracking with respect to a track having a track pitch narrower than the diffraction limit of light.

An information recording medium according to an aspect of the invention includes a first mark disposed at a center of a track; a second mark disposed away from the center of the track in a tracking direction thereof by a predetermined distance b1, and disposed away from the first mark in a direction along the track by a predetermined distance L1; and a third mark disposed away from the center of the track in a tracking direction opposite to the tracking direction of the second mark by a predetermined distance b2, and disposed away from the first mark in the direction along the track by a predetermined distance L2. The second mark and the third mark generate scattered light depending on a distance between a scattering medium provided in an optical information apparatus, and each of the second mark and the third mark by irradiating the scattering medium with light. The predetermined distance b1 and the predetermined distance b2 are smaller than 50 nm. A difference between the predetermined distance L1 and the predetermined distance L2 is larger than a sum of a length of the first mark in the direction along the track, and a length of the second mark in the direction along the track.

According to the above configuration, the information recording medium is provided with the first mark disposed at the center of the track; the second mark disposed away from the center of the track in the tracking direction thereof by the predetermined distance b1, and disposed away from the first mark in the direction along the track by the predetermined distance L1; and the third mark disposed away from the center of the track in the tracking direction opposite to the tracking direction of the second mark by the predetermined distance b2, and disposed away from the first mark in the direction along the track by the predetermined distance L2. The second mark and the third mark generate scattered light depending on the distance between the scattering medium provided in the optical information apparatus, and each of the second mark and the third mark by irradiating the scattering medium with light. The predetermined distance b1 and the predetermined distance b2 are smaller than 50 nm. The difference between the predetermined distance L1 and the predetermined distance L2 is larger than the sum of the length of the first mark in the direction along the track, and the length of the second mark in the direction along the track.

According to the invention, the second mark and the third mark are disposed to be displaced away from each other in the tracking directions opposite to each other, and a tracking signal is generated based on the intensity of scattered light when the scattering medium comes close to the second mark, and based on the intensity of scattered light when the scattering medium comes close to the third mark. Accordingly, it is possible to stably perform tracking with respect to a track having a track pitch narrower than the diffraction limit of light.

These and other objects, features and advantages of the present invention will become more apparent upon reading the following detailed description along with the accompanying drawings.

DESCRIPTION OF EMBODIMENTS

In the following, embodiments of the invention are described referring to the accompanying drawings. The following embodiments are merely examples embodying the invention, and do not limit the technical feature of the invention.

First Embodiment

There is known a phenomenon as described below. In the case where two particles of a metal (for instance, gold or silver) are present in proximity to each other, and if light having a polarization direction aligned with the direction connecting between the centers of the particles is irradiated, the intensity of irradiated light that scatters varies depending on the distance between the two particles (Confined plasmons in nanofabricated single silver particle pairs: experimental observations of strong interparticle interactions, L. Gunnarsson et al., J. Phys. Chem. B, 2005, 109, 1079-1087). In the following, the example shown in FIG. 6 of the above literature is described referring to FIG. 1, and FIGS. 2A to 2E.

Figure 1:
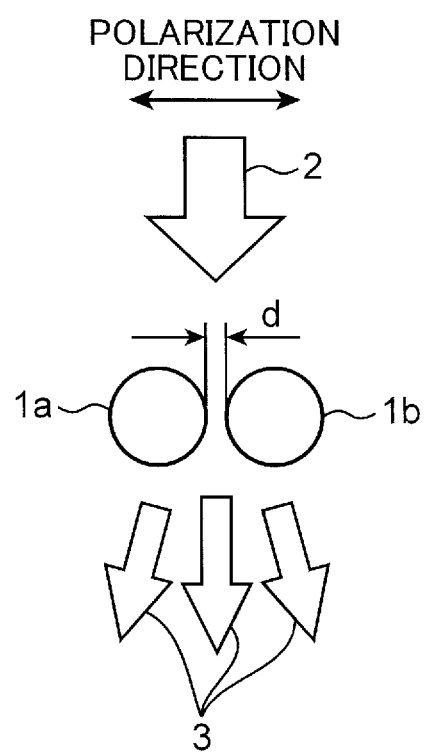
FIG. 1 is a schematic diagram for describing an experimental example, in which two particles are irradiated with light.
Figure 2A:
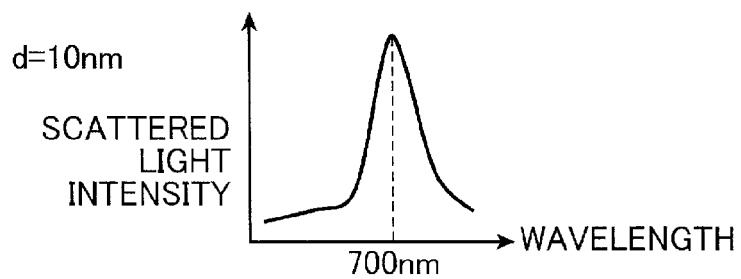
FIG. 2A is a diagram showing a relationship between wavelength of light and scattered light intensity, in the case where the interparticle distance is 10 nm.
Figure 2B:
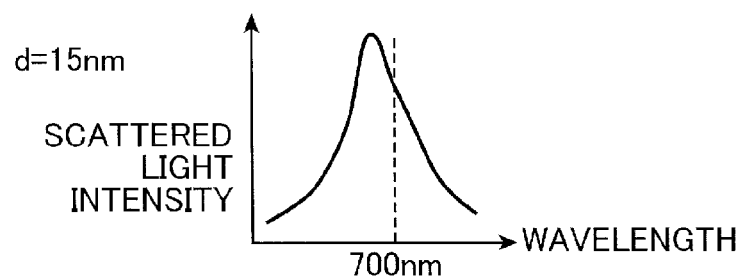
FIG. 2B is a diagram showing a relationship between wavelength of light and scattered light intensity, in the case where the interparticle distance is 15 nm.
Figure 2C:
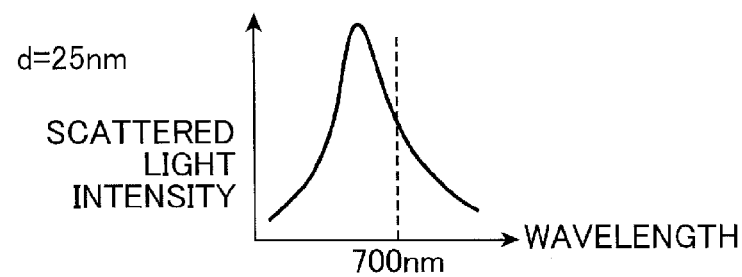
FIG. 2C is a diagram showing a relationship between wavelength of light and scattered light intensity, in the case where the interparticle distance is 25 nm.
Figure 2D:
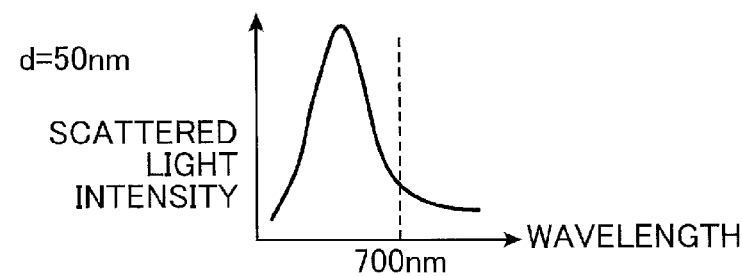
FIG. 2D is a diagram showing a relationship between wavelength of light and scattered light intensity, in the case where the interparticle distance is 50 nm.
Figure 2E:
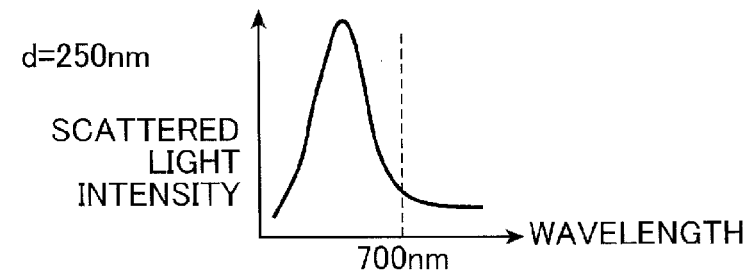
FIG. 2E is a diagram showing a relationship between wavelength of light and scattered light intensity, in the case where the interparticle distance is 250 nm.

FIG. 1 is a schematic diagram for describing an experimental example, in which two particles are irradiated with light. FIG. 2A is a diagram showing a relationship between wavelength of light and scattered light intensity, in the case where the interparticle distance is 10 nm; FIG. 2B is a diagram showing a relationship between wavelength of light and scattered light intensity, in the case where the interparticle distance is 15 nm; FIG. 2C is a diagram showing a relationship between wavelength of light and scattered light intensity, in the case where the interparticle distance is 25 nm; FIG. 2D is a diagram showing a relationship between wavelength of light and scattered light intensity, in the case where the interparticle distance is 50 nm; and FIG. 2E is a diagram showing a relationship between wavelength of light and scattered light intensity, in the case where the interparticle distance is 250 nm.

As shown in FIG. 1, columnar-shaped two particles $1a$ and $1b$ made of silver, and having a diameter of 90 nm and a height of 25 nm are disposed away from each other by a predetermined distance d [nm]. A light beam 2 is irradiated onto the space between the two particles $1a$ and $1b$. The light beam 2 has such a polarization that the electric field oscillates in a direction connecting between the centers of the two particles $1a$ and $1b$. When the light beam 2 is irradiated onto the space between the two particles $1a$ and $1b$, scattered light 3 is generated.

In the case where the distance d between the two particles $1a$ and $1b$ is 10 nm, the intensity of the scattered light 3 at 700 nm wavelength is maximum (see FIG. 2A). Further, in the case where the distance d between the two particles $1a$ and $1b$ is 15 nm, the intensity peak of the scattered light 3 is shifted to the short wavelength side; and the intensity of the scattered light 3 at 700 nm wavelength is slightly lowered to about 80% of the intensity of the scattered light 3 in the case where the distance d is 10 nm (see FIG. 2B).

Further, in the case where the distance d between the two particles $1a$ and $1b$ is 25 nm, shift of a peak in intensity of the scattered light 3 increases, and the intensity of the scattered light 3 at 700 nm wavelength is lowered to about 60% of the intensity of the scattered light 3 in the case where the distance d is 10 nm (see FIG. 2C). Furthermore, in the case where the distance d between the two particles $1a$ and $1b$ is 50 nm, shift of a peak in intensity of the scattered light 3 further increases, and the intensity of the scattered light 3 at 700 nm wavelength is lowered to about 30% of the intensity of the scattered light 3 in the case where the distance d is 10 nm (see FIG. 2D).

Furthermore, in the case where the distance between the two particles $1a$ and $1b$ is 250 nm, the scattered light 3 hardly undergoes interaction between the two particles $1a$ and $1b$, and the behavior of the two particles $1a$ and $1b$ is similar to the behavior of particles isolated from each other. As a result, the intensity of the scattered light 3 at 700 nm wavelength is lowered to about 20% or smaller of the intensity of the scattered light 3 in the case where the distance d is 10 nm (see FIG. 2E).

As described above, once a specific wavelength is determined, the intensity of scattered light uniformly changes depending on the distance between two particles. Utilizing the above phenomenon, one of two particles is used as a mark on the side of an optical disc i.e. an information recording medium, and the other of the two particles is used as a scattering medium (or an antenna) on the side of an optical head for reproducing information. In the above configuration, it is possible to obtain scattered light depending on the distance between the mark on the optical disc and the scattering medium. Receiving the scattered light on a detector, and converting the received light into an electrical signal makes it possible to detect the distance between the mark on the optical disc and the scattering medium on the optical head side.

Figure 3:
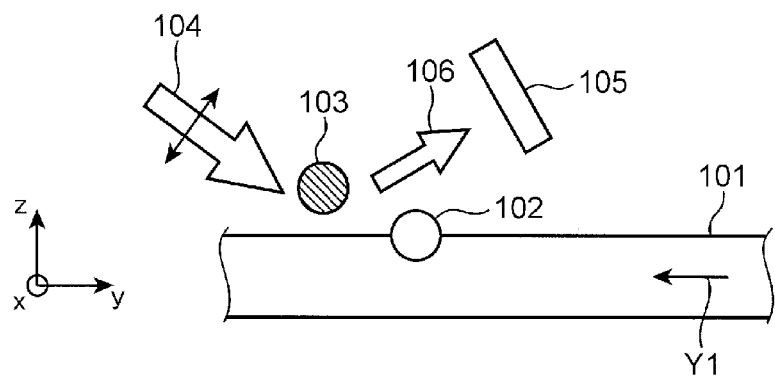
FIG. 3 is a cross sectional view showing a scattering medium provided in an optical head, and a mark formed on an optical disc.

FIG. 3 is a cross sectional view showing a scattering medium provided in an optical head, and a mark formed on an optical disc. Referring to FIG. 3, there is formed a mark 102 acting as a particle on an optical disc 101, and there is formed a scattering medium 103 acting as a counterpart particle on the optical head side. Excitation light 104 enters to the scattering medium 103 from the left side in FIG. 3, and scattered light 106 is received on a detector 105. The excitation light 104 is linearly polarized light having such a polarization direction that the electric field vector is aligned with the direction connecting between the center of the mark 102 and the center of the scattering medium 103 when the mark 102 and the scattering medium 103 come closest to each other. Further, the wavelength of the excitation light 104 is such that the scattering intensity is maximum when the mark 102 and the scattering medium 103 come closest to each other. An example of the scattering medium is a particle of gold or a particle of silver. An example of the mark 102 is a mark including a film of a metal such as gold. In this example, the optical disc 101 is rotated in the arrow Y1 direction.

Figure 4A:
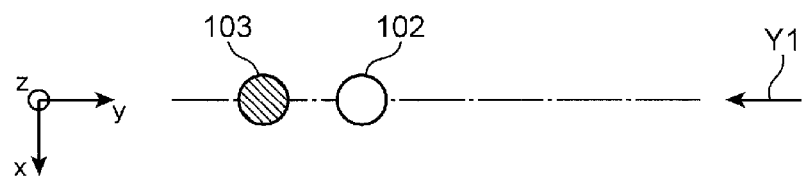
FIG. 4A is a top plan view of the scattering medium and the mark shown in FIG. 3 as viewed from above the top surface of the optical disc.
Figure 4B:
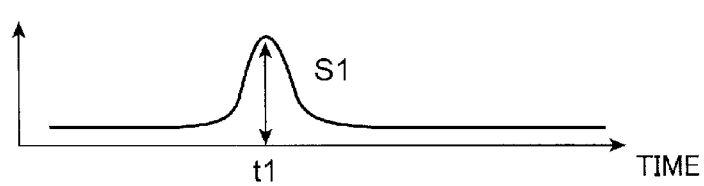
FIG. 4B is a diagram showing an example of a signal to be obtained from a detector.

FIG. 4A is a top plan view of the scattering medium and the mark shown in FIG. 3 as viewed from above the top surface of the optical disc. The scattering medium 103 is present immediately above the moving direction of the mark 102. When the scattering medium 103 and the mark 102 come closest to each other, the intensity of scattered light is maximum. FIG. 4B is a diagram showing an example of a signal to be obtained from the detector 105. As shown in FIG. 4B, at a point of time t1, the mark 102 and the scattering medium 103 come closest to each other, and a value S1 of a signal detected at the point of time t1 is maximum.

Figure 5A:
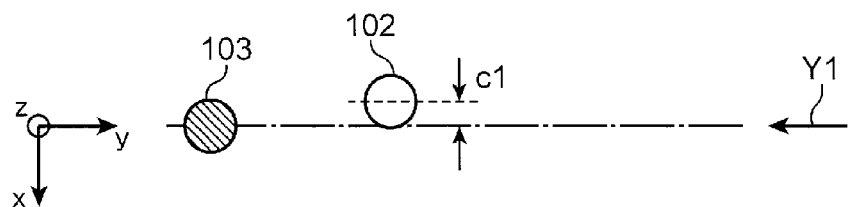
FIG. 5A is a top plan view of a scattering medium and a mark as viewed from above the top surface of the optical disc, in the case where the mark is displaced from the center of the track.
Figure 5B:
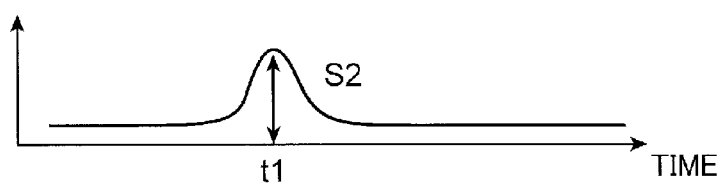
FIG. 5B is a diagram showing an example of a signal to be obtained from the detector, in the case where the mark is displaced from the center of the track.

On the other hand, FIG. 5A is a top plan view of a scattering medium and a mark as viewed from above the top surface of the optical disc, in the case where the mark is displaced from the center of the track. Referring to FIG. 5A, a mark 102 is displaced from the center of the track in a direction (tracking direction) perpendicular to the moving direction of the mark 102, by a distance c1. A scattering medium 103 is present above the center of the track. FIG. 5B is a diagram showing an example of a signal to be obtained from the detector 105, in the case where the mark is displaced from the center of the track as described above. In the case where the mark 102 is displaced from the center of the track, as with the case of FIG. 4B, the intensity of scattered light is maximum at a point of time t1, but a value S2 of a signal is smaller than the value S1.

Figure 6A:
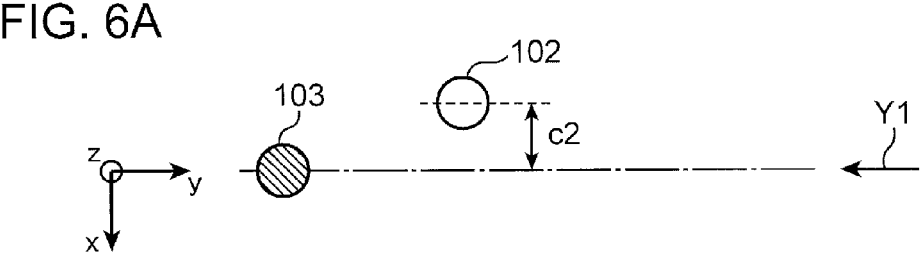
FIG. 6A is a top plan view of a scattering medium and a mark as viewed from above the top surface of the optical disc, in the case where the mark is further displaced from the center of the track.
Figure 6B:
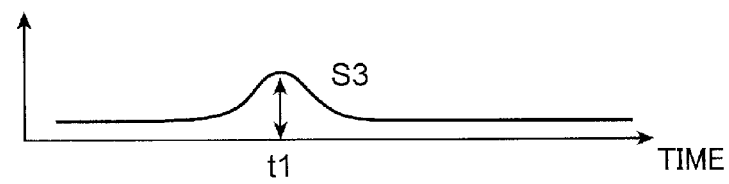
FIG. 6B is a diagram showing an example of a signal to be obtained from the detector, in the case where the mark is further displaced from the center of the track.

Further, FIG. 6A is a top plan view of a scattering medium and a mark as viewed from above the top surface of the optical disc, in the case where the mark is further displaced from the center of the track. Referring to FIG. 6A, a mark 102 is displaced from the center of the track in a direction (tracking direction) perpendicular to the moving direction of the mark 102, by a distance c2 (c2>c1). A scattering medium 103 is present above the center of the track. FIG. 6B is a diagram showing an example of a signal to be obtained from the detector 105, in the case where the mark is further displaced from the center of the track. Although the mark 102 and the scattering medium 103 come closest to each other at a point of time t1, and the intensity of scattered light is maximum at the point of time t1, but a value S3 of a signal is smaller than the value S2.

Next, there are described cases, in which marks are formed in a zigzag manner, referring to FIGS. 7A to 9B. Firstly, there is described a case, in which a scattering medium moves over the center of the track.

Figure 7A:
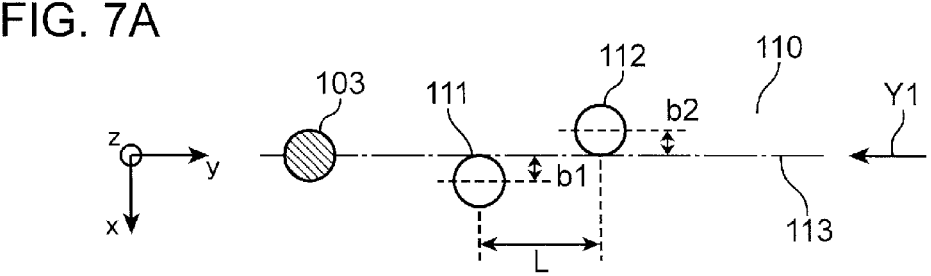
FIG. 7A is a top plan view showing a configuration of a scattering medium and two marks, in the case where the scattering medium moves over the center of the track.

FIG. 7A is a top plan view showing a configuration of a scattering medium and two marks, in the case where the scattering medium moves over the center of the track. A mark 111 is disposed with displacement from the center of a track 113 in the tracking direction thereof by a distance b1. A mark 112 is disposed with displacement from the center of the track 113 in a tracking direction opposite to the tracking direction of the mark 111 by a distance b2. The mark 111 and the mark 112 are away from each other in a direction along the track 113 by a distance L.

Figure 7B:
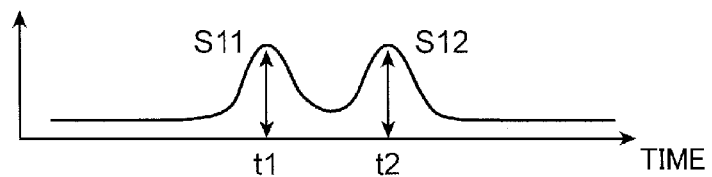
FIG. 7B is a diagram showing an example of a signal to be detected, in the case where the scattering medium moves over the center of the track with respect to the configuration of the marks shown in FIG. 7A.

FIG. 7B is a diagram showing a signal to be detected, in the case where the scattering medium 103 moves over the center of the track 113 with respect to the configuration of the marks shown in FIG. 7A. At a point of time t1, the scattering medium 103 comes closest to the mark 111, and a signal in accordance with the intensity of scattered light is detected. Further, at a point of time t2, the scattering medium 103 comes closest to the mark 112, and a signal in accordance with the intensity of scattered light is detected. The distance L between the mark 111 and the mark 112, and a linear velocity v of a rotating optical disc 110 have a relation as expressed by the following formula (1).

$$L = v \times (t2 - t1) \tag{1}$$

In the case where the distance b1 and the distance b2 are equal to each other, and the distance b1 and the distance b2 are shorter than about 50 nm, which is a distance at which scattered light by interparticle resonance is obtained, a value S11 of a signal detected at the point of time t1, and a value S12 of a signal detected at the point of time t2 are equal to each other. Accordingly, the value obtained by subtracting the signal value S12 from the signal value S11 is zero.

Figure 8A:
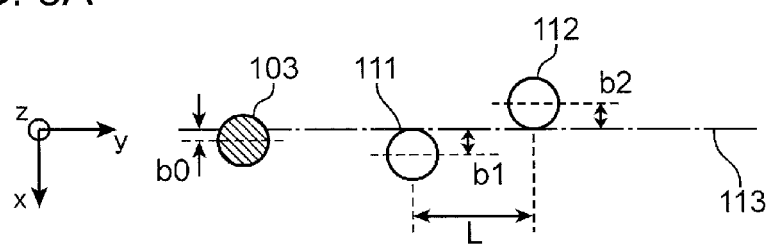
FIG. 8A is a top plan view showing a configuration of a scattering medium and two marks, in the case where the scattering medium moves with displacement toward the side of one of the marks relative to the center of the track by a distance b0.
Figure 8B:
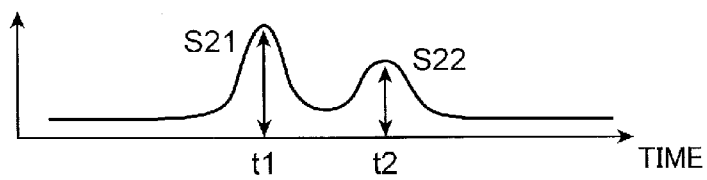
FIG. 8B is a diagram showing an example of a signal to be detected, in the case where the scattering medium moves with displacement toward the side of the one of the marks relative to the center of the track with respect to the configuration of the marks shown in FIG. 8A.

Next, there is described a case, in which a scattering medium 103 moves from the center of the track 113 with displacement toward the mark 111 side. FIG. 8A is a top plan view showing a configuration of the scattering medium 103 and two marks 111 and 112, in the case where the scattering medium 103 moves with displacement toward the mark 111 side from the center of the track 113, by a distance b0. FIG. 8B is a diagram showing an example of a signal to be detected, in the case where the scattering medium 103 moves with displacement toward the mark 111 side from the center of the track 113 with respect to the configuration of the marks shown in FIG. 8A.

At a point of time t1, the scattering medium 103 comes closest to the mark 111, and a signal in accordance with the intensity of scattered light is detected. Further, at a point of time t2, the scattering medium 103 comes closest to the mark 112, and a signal in accordance with the intensity of scattered light is detected. The distance between the scattering medium 103 and the mark 111 is shorter than the distance shown in FIG. 7A by the distance b0. Accordingly, a value S21 of a signal detected at the point of time t1 is larger than the value S11 shown in FIG. 7B. On the other hand, the distance between the scattering medium 103 and the mark 112 is longer than the distance shown in FIG. 7A by the distance b0. Accordingly, a value S22 of a signal detected at the point of time t2 is smaller than the value S12 shown in FIG. 7B. Thus, the value obtained by subtracting the signal value S22 from the signal value S21 is a plus value.

Figure 9A:
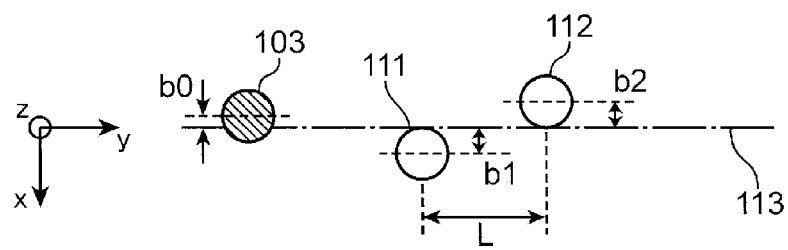
FIG. 9A is a top plan view showing a configuration of a scattering medium and two marks, in the case where the scattering medium moves with displacement toward the side of the other of the marks relative to the center of the track by the distance b0.
Figure 9B:
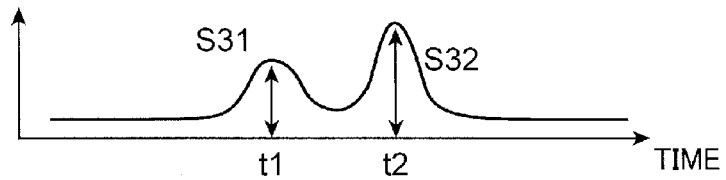
FIG. 9B is a diagram showing an example of a signal to be detected, in the case where the scattering medium moves with displacement toward the side of the other of the marks relative to the center of the track with respect to the configuration of the marks shown in FIG. 9A.

Further, there is described a case, in which a scattering medium 103 moves with displacement toward the mark 112 side from the center of the track 113. FIG. 9A is a top plan view showing a configuration of the scattering medium 103 and two marks 111 and 112, in the case where the scattering medium 103 moves with displacement toward the mark 112 side from the center of the track 113, by the distance b0. FIG. 9B is a diagram showing an example of a signal to be detected in the case where the scattering medium 103 moves with displacement toward the mark 112 side from the center of the track 113 with respect to the configuration of the marks shown in FIG. 9A.

At a point of time t1, the scattering medium 103 comes closest to the mark 111, and a signal in accordance with the intensity of scattered light is detected. Further, at a point of time t2, the scattering medium 103 comes closest to the mark 112, and a signal in accordance with the intensity of scattered light is detected. The distance between the scattering medium 103 and the mark 111 is longer than the distance shown in FIG. 7A by the distance b0. Accordingly, a value S31 of a signal detected at the point of time t1 is smaller than the value S11 shown in FIG. 7B. On the other hand, the distance between the scattering medium 103 and the mark 112 is smaller than the distance shown in FIG. 7A by the distance b0. Accordingly, a value S32 of a signal detected at the point of time t2 is larger than the value S12 shown in FIG. 7B. Thus, the value obtained by subtracting the value S32 of the signal from the value S31 of the signal is a minus value.

As described above, utilizing a phenomenon that the intensity of scattered light (evanescent light) generated by an interparticle resonance (plasmon resonance) varies depending on the interparticle distance, the intensity of scattered light at a position where a mark is disposed is detected, and a difference between signals to be detected at timings corresponding to mark positions is calculated. By the above configuration, it is possible to detect a positional relationship between the center of the track and the scattering medium, including the polarities. As disclosed in the example of the above literature, however, it is necessary to make the offset amount (the distance b1 and the distance b2) i.e. the interparticle distance to about 50 nm or smaller with respect to 700 nm wavelength light in order to utilize the above phenomenon.

The distance b1 and the distance b2 are distances shorter than 1/10 of the wavelength of light. If the distance b1 and the distance b2 are 50 nm or longer, scattered light becomes extremely weak, and it is difficult to detect the scattered light. In a conventional example, light of about 400 nm wavelength is used, and the offset amount between pits is set to about 80 nm, which is about 1/5 of the wavelength of light. As compared with the conventional example, it is clear that the marks are disposed with a smaller offset amount in the embodiment.

Further, in the example disclosed in the above literature, the size of particles is about 90 nm in diameter, which is smaller than 100 nm. Since the size of such a mark is too small, it is impossible to detect a signal at a good S/N ratio with use of a conventional light spot. Use of the interparticle resonance as described above makes it possible to detect a very small distance, with use of a small mark that is difficult to be detected by a conventional light spot, and to obtain a tracking signal with respect to a track having a track pitch narrower than the diffraction limit, as described in the embodiment.

The method according to the embodiment is suitable for detecting a tracking signal with respect to a higher-density information recording medium, as compared with a conventional method using a light spot. It is necessary to make the offset amount between marks to a value smaller than about 50 nm, preferably, smaller than 25 nm in order to perform tracking with respect to a high-density information recording medium.

Further, the distance L between the marks displaced from each other in the direction along the track is preferably larger than about 25 nm. This is because a smaller distance between the marks may cause a resonance between the marks, and if a scattering medium approaches in the above state, a resonance between three particles may occur, which may result in detection of scattered light other than the scattered light to be generated by an intended resonance. In view of the above, it is necessary to set the distance L to a value substantially equal to at least two times of the diameter of the mark. Further, in the case where the sizes of two marks differ from each other, it is necessary to set the distance L to a value substantially equal to the sum of the diameters of the two marks.

Figure 10A:
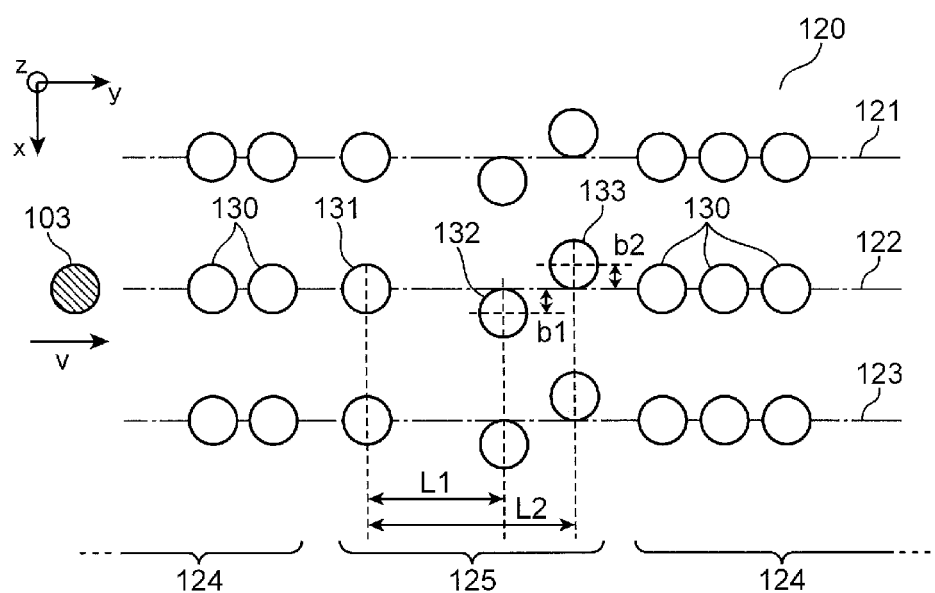
FIG. 10A is a partially enlarged top plan view showing the tracks on the optical disc.

A detailed example is described referring to FIG. 10A. FIG. 10A is a partially enlarged top plan view of tracks 121, 122, and 123 on an optical disc 120. The optical disc 120 is provided with data areas 124 and servo areas 125. In each of the data areas 124, information is recorded by data marks 130 in the form of arrays. In each of the servo areas 125, trigger marks 131 for use in tracking servo control, first wobble marks 132, and second wobble marks 133 are formed.

The optical disc 120 is provided with the trigger marks 131, the first wobble marks 132, and the second wobble marks 133. Each trigger mark 131 plays a role as a trigger for starting tracking control, and serves as a reference for determining timings at which the scattering medium passes by the corresponding first wobble mark 132 and by the corresponding second wobble mark 133. Each trigger mark 131 is disposed at the center of the corresponding track.

The first wobble mark 132 and the second wobble mark 133 are disposed to be away from the center of the track 122 in tracking directions opposite to each other by a predetermined distance b1 and by a predetermined distance b2, respectively. The distance from the trigger mark 131 to the first wobble mark 132 in the direction along the track 122 is set to L1, and the distance from the trigger mark 131 to the second wobble mark 133 in the direction along the track 122 is set to L2. The scattering medium 103 moves along the track 122 at a relative velocity v.

Specifically, the first wobble mark 132 is disposed away from the center of the track 122 in the tracking direction thereof by the predetermined distance b1, and is disposed away from the trigger mark 131 in the direction along the track 122 by the predetermined distance L1. Further, the second wobble mark 133 is disposed away from the center of the track 122 in the tracking direction opposite to the tracking direction of the first wobble mark 132 by the predetermined distance b2, and is disposed away from the trigger mark 131 in the direction along the track 122 by the predetermined distance L2. In this embodiment, the distance b1 is equal to the distance b2.

Figure 10B:
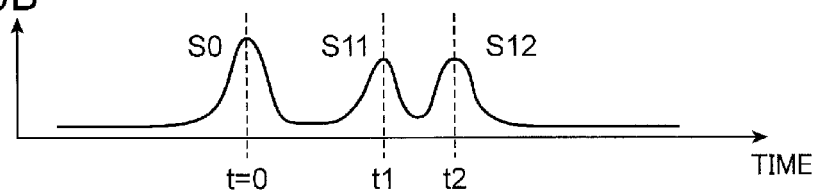
FIG. 10B is a diagram showing a signal to be detected, in the case where a scattering medium moves over the center of the track with respect to the configuration of the marks shown in FIG. 10A.

FIG. 10B is a diagram showing a signal to be detected, in the case where the scattering medium moves over the center of the track with respect to the configuration of the marks shown in FIG. 10A.

At a point of time t0, the scattering medium 103 comes closest to the trigger mark 131, and a signal in accordance with the intensity of scattered light is detected. Then, at a point of time t1, the scattering medium 103 comes closest to the first wobble mark 132, and a signal in accordance with the intensity of scattered light is detected. Then, at a point of time t2, the scattering medium 103 comes closest to the second wobble mark 133, and a signal in accordance with the intensity of scattered light is detected.

Figure 11:
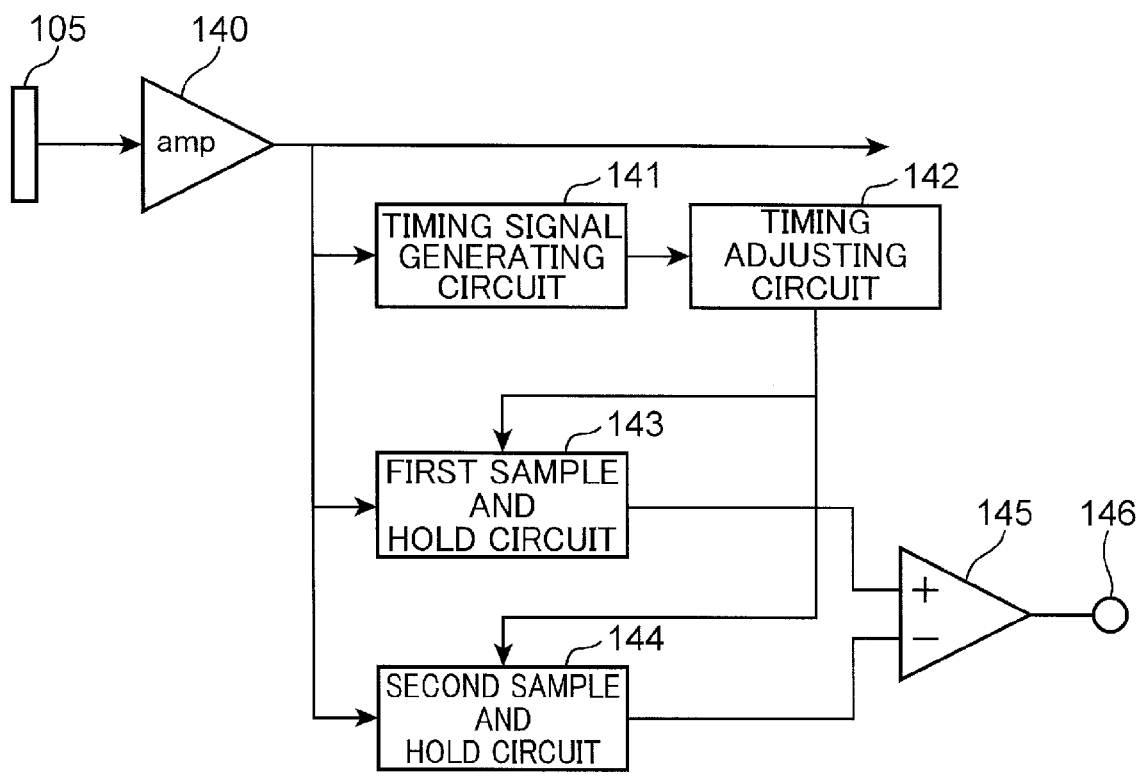
FIG. 11 is a diagram showing a configuration of a tracking signal computing circuit according to a first embodiment of the invention.

FIG. 11 is a diagram showing a configuration of a tracking signal computing circuit in the first embodiment. The tracking signal computing circuit is provided with an IV conversion amplifier 140, a timing signal generating circuit 141, a timing adjusting circuit 142, a first sample and hold circuit 143, a second sample and hold circuit 144, a difference computing circuit 145, and a terminal 146.

Light scattered between the scattering medium 103 and each of the marks is detected by the detector 105. The detector 105 converts the detected light into a current signal. The current signal output from the detector 105 is converted into a voltage signal by the IV conversion amplifier 140. The signal output from the IV conversion amplifier 140 is also used for reproducing the information recorded in the data marks 130.

The timing signal generating circuit 141 detects that the scattering medium 103 has passed the trigger mark 131, based on a signal output from the IV conversion amplifier 140, and generates a timing pulse indicating that the scattering medium 103 has passed the trigger mark 131. The timing adjusting circuit 142 sets a point of time t, at which a timing pulse indicating that the scattering medium 103 has passed the trigger mark 131 is generated, to zero. The timing adjusting circuit 142 receives a timing pulse from the timing signal generating circuit 141, transmits a sampling pulse to the first sample and hold circuit 143 at a timing corresponding to a first point of time t1=L1/v at which the scattering medium 103 passes by the first wobble mark 132, and transmits a sampling pulse to the second sample and hold circuit 144 at a timing corresponding to a second point of time t2=L2/v at which the scattering medium 103 passes by the second wobble mark 133.

The first sample and hold circuit 143 receives a sampling pulse from the timing adjusting circuit 142, and samples and holds a value S11 of a signal from the IV conversion amplifier 140 at a timing corresponding to the first point of time t1. Likewise, the second sample and hold circuit 144 receives a sampling pulse from the timing adjusting circuit 142, and samples and holds a value S12 of a signal from the IV conversion amplifier 140 at a timing corresponding to the second point of time t2.

The difference computing circuit 145 receives the value S11 to be output from the first sample and hold circuit 143, and the value S12 to be output from the second sample and hold circuit 144, and calculates a difference between the value S11 and the value S12. Calculating the difference between the sampled two values S11 and S12 generates a tracking signal. The generated tracking signal is output to the terminal 146.

The servo areas 125 are disposed in the periphery of the optical disc 120. A tracking signal in a region between a certain servo area and a succeeding servo area is held by an unillustrated hold circuit. Further, tracking signals to be obtained from the servo areas may be subjected to an averaging process and used in order to obtain a smooth tracking signal. Further, a tracking signal to be obtained from each of the servo areas may be treated as a discrete error signal, based on a digital servo control theory.

Figure 12:
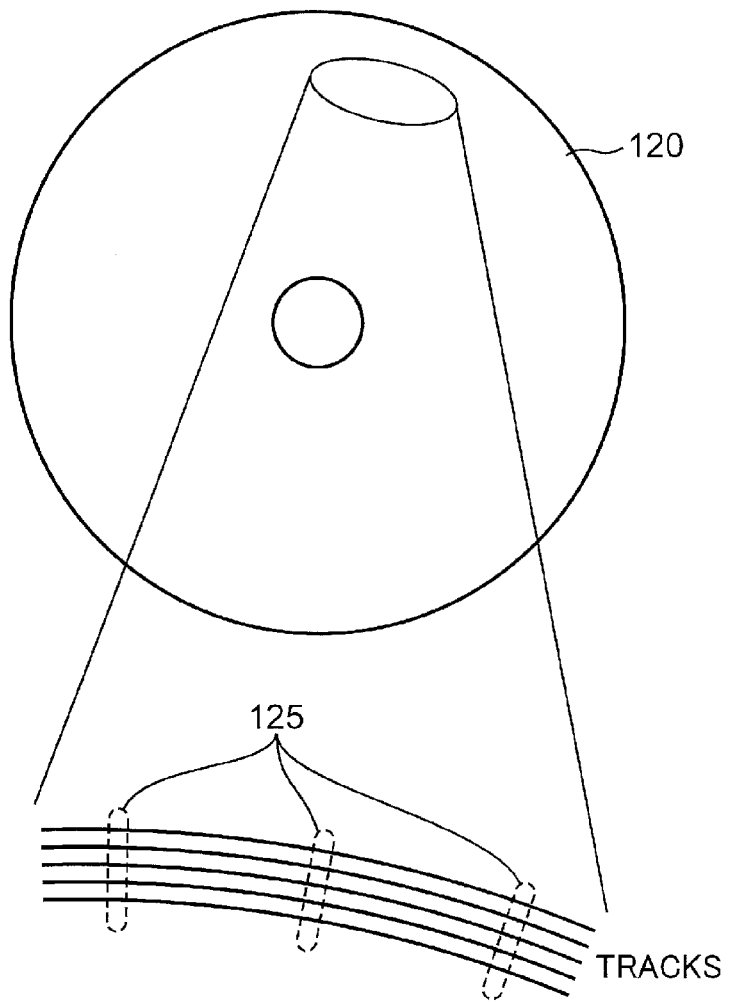
FIG. 12 is a partially enlarged view for describing a configuration of servo areas on the optical disc.
Figure 13:
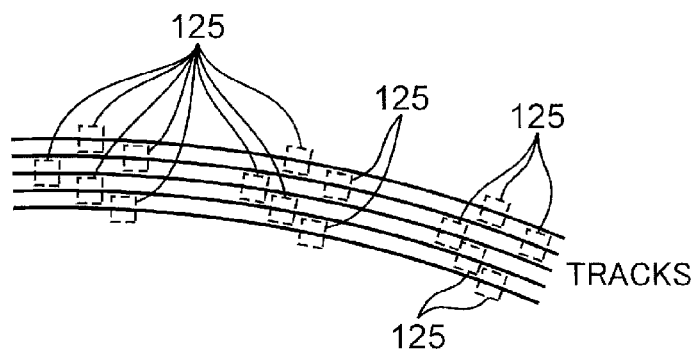
FIG. 13 is a partially enlarged view for describing another configuration of servo areas on the optical disc.

FIG. 12 is a partially enlarged view for describing a configuration of the servo areas 125 on the optical disc 120. FIG. 13 is a partially enlarged view for describing another configuration of the servo areas 125 on the optical disc 120. As shown in FIG. 12, the servo areas 125 may be disposed to be aligned with each other on the tracks adjacent to each other. Further, as shown in FIG. 13, the servo areas 125 may be disposed to be displaced from each other on the tracks adjacent to each other.

Figure 14:
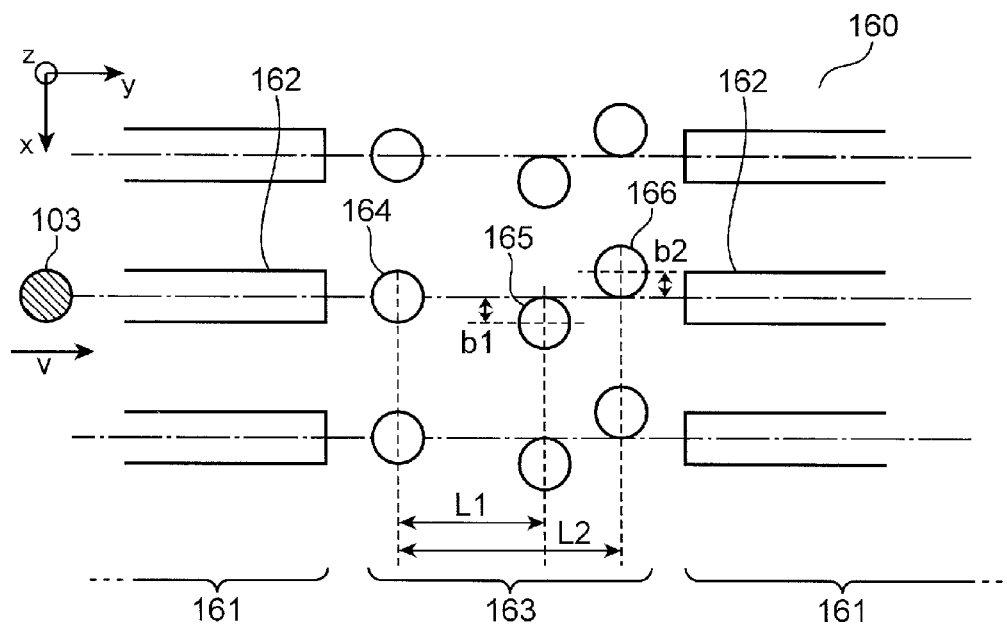
FIG. 14 is a partially enlarged top plan view showing an optical disc as a modification of the first embodiment.
Figure 15:
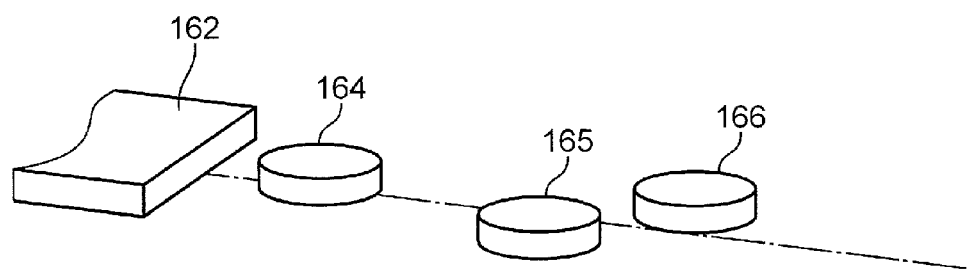
FIG. 15 is a partially enlarged perspective view showing the optical disc as the modification of the first embodiment.

FIG. 14 is a partially enlarged top plan view showing an optical disc as a modification of the first embodiment. FIG. 15 is a partially enlarged perspective view showing the optical disc as the modification of the first embodiment. An optical disc 160 is provided with data areas 161 and servo areas 163.

In each of the data areas 161, information is recorded in linear grooves 162 each having a predetermined width. In each of the servo areas 163, trigger marks 164 for use in tracking servo control, first wobble marks 165, and second wobble marks 166 are formed. Each servo area 163 has substantially the same configuration as the servo area 125 shown in FIG. 10A. The trigger mark 164 has a columnar shape as shown in the perspective view of FIG. 15. Further, the first wobble mark 165 and the second wobble mark 166 also have a columnar shape. As described above, the data area 161 in the form of grooves, and the servo area 163 in the form of marks may be combined with each other.

Figure 16:
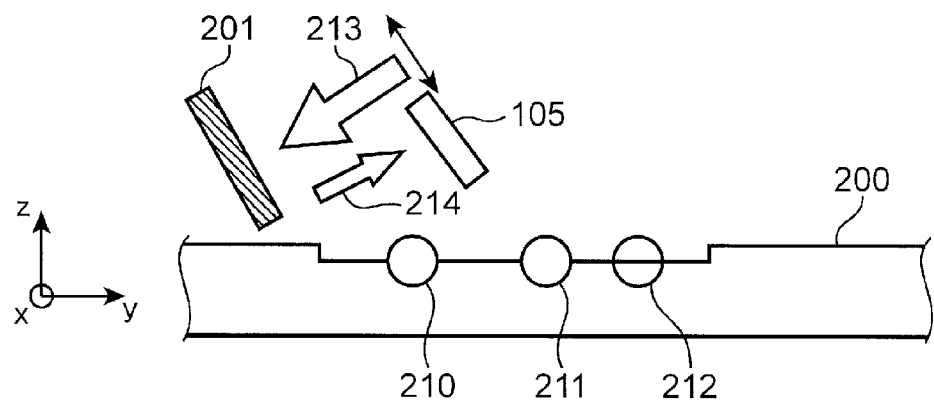
FIG. 16 is a cross sectional view showing a scattering medium in the shape of a triangular plate, and marks formed on an optical disc.

In this embodiment, the scattering medium has a spherical shape. The invention is not specifically limited to the above, but the scattering medium may have a shape other than the above. FIG. 16 is a cross sectional view showing a scattering medium in the form of a triangular plate, and marks formed on an optical disc.

The light incident surface of a metal antenna 201 as a scattering medium has a triangular shape. The metal antenna 201 has a plate shape. A tip end of the metal antenna 201 faces an optical disc 200 as an information recording medium. The light incident surface of the metal antenna 201 has a predetermined angle with respect to a surface of the optical disc 200.

A light beam 213 is irradiated onto the metal antenna 201 obliquely leftwardly and downwardly as shown in FIG. 16. Part of the light beam 213 irradiated onto the metal antenna 201 is reflected and detected by the detector 105. Reflected light 214 is converted into an electric signal in accordance with the amount of light received on the detector 105.

The reflected light 214 varies depending on the distance between the tip end of the metal antenna 201 and a mark as a resonating particle. When a resonance occurs, energy that emanates and scatters from dipoles excited between the metal antenna 201 and the mark increases. This results in lowering of the reflectance. As a result, a signal to be obtained when the metal antenna 201 and the mark come closest to each other is lowered.

Figure 17A:
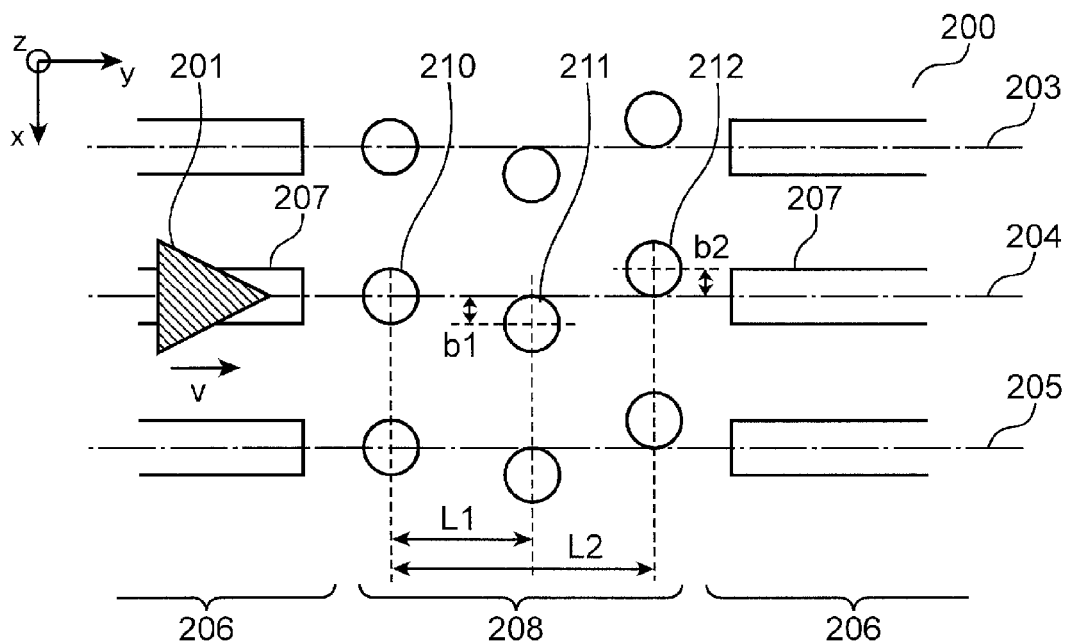
FIG. 17A is a top plan view showing the scattering medium and the optical disc shown in FIG. 16.

FIG. 17A is a top plan view showing the metal antenna and the optical disc shown in FIG. 16. FIG. 17A enlargedly shows a servo area and a vicinity thereof, including tracks 203 and 204 on the optical disc 200. The optical disc 200 is provided with data areas 206 and servo areas 208.

In each of the data areas 206, information is recorded in linear grooves 207 each having a predetermined width. In each of the servo areas 208, trigger marks 210, first wobble marks 211, and second wobble marks 212 are formed. Each trigger mark 210 for use in synchronization plays a role as a trigger, and serves as a reference for determining timings at which the metal antenna 201 passes by the corresponding first wobble mark 211 and by the corresponding second wobble mark 212. Each trigger mark 210 is disposed at the center of the corresponding track.

The first wobble mark 211 and the second wobble mark 212 are disposed from the center of the track 204 in directions opposite to each other by a predetermined distance b1 and by a predetermined distance b2, respectively. The distance from the trigger mark 210 to the first wobble mark 211 in the direction along the track 204 is set to L1, and the distance from the trigger mark 210 to the second wobble mark 212 in the direction along the track 204 is set to L2. The metal antenna 201 moves along the track 204 at a relative velocity v.

Specifically, the first wobble mark 211 is disposed away from the center of the track 204 in the tracking direction thereof by the predetermined distance b1, and is disposed away from the trigger mark 210 in the direction along the track 204 by the predetermined distance L1. Further, the second wobble mark 212 is disposed away from the center of the track 204 in the tracking direction opposite to the tracking direction of the first wobble mark 211 by the predetermined distance b2, and is disposed away from the trigger mark 210 in the direction along the track 204 by the predetermined distance L2. In this embodiment, the distance b1 is equal to the distance b2.

Figure 17B:
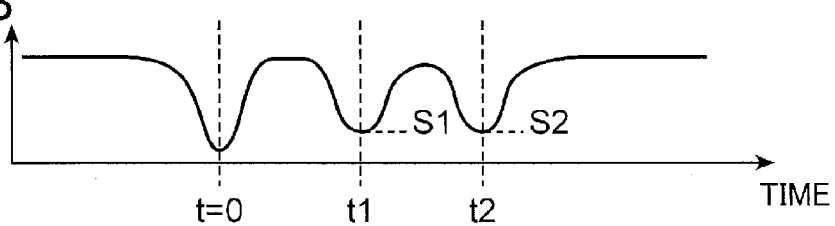
FIG. 17B is a diagram showing a signal to be detected, in the case where the scattering medium moves over the center of the track with respect to the configuration of the marks shown in FIG. 17A.

FIG. 17B is a diagram showing a signal to be detected, in the case where the metal antenna moves over the center of the track with respect to the configuration of the marks shown in FIG. 17A.

At a point of time t0, the metal antenna 201 comes closest to the trigger mark 210, and a signal in accordance with the intensity of scattered light is detected. Then, at a point of time t1, the metal antenna 201 comes closest to the first wobble mark 211, and a signal in accordance with the intensity of scattered light is detected. Then, at a point of time t2, the metal antenna 210 comes closest to the second wobble mark 212, and a signal in accordance with the intensity of scattered light is detected.

A signal detected by the detector 105 is output to a tracking signal computing circuit. The configuration of the tracking signal computing circuit is substantially the same as the configuration shown in FIG. 11.

Firstly, the metal antenna 201 passes the trigger mark 210. The timing adjusting circuit 142 sets a point of time t at which the metal antenna 201 has passed the trigger mark 210 to zero. The first sample and hold circuit 143 samples and holds a value S1 of a signal to be output from the detector 105 at a timing corresponding to the point of time t1=L1/v at which the metal antenna 201 passes by the first wobble mark 211, based on the point of time at which the metal antenna 201 has passed the trigger mark 210. Further, the second sample and hold circuit 144 samples and holds a value S2 of a signal to be output from the detector 105 at a timing corresponding to the point of time t2=L2/v at which the metal antenna 201 passes by the second wobble mark 212, based on the point of time at which the metal antenna 201 has passed the trigger mark 210. The difference computing circuit 145 calculates a difference between the value S1 of the signal sampled by the first sample and hold circuit 143, and the value S2 of the signal sampled by the second sample and hold circuit 144, as a tracking signal.

As shown in FIG. 16, the first wobble mark 211 and the second wobble mark 212 have such a shape as to protrude toward the metal antenna side, and a change in resonance state is detected by allowing the metal antenna 201 as a scattering medium to physically approach the first wobble mark 211 or the second wobble mark 212. In view of the above, the distance between the metal antenna 201 and the optical disc 200 (the first wobble mark 211 and the second wobble mark 212) is preferably at least 50 nm or smaller, and more preferably, 25 nm or smaller.

Further, the distance between the first wobble mark 211 and the second wobble mark 212 is set to a value substantially equal to two times of the diameter of a mark in order to distinguish between a state that the metal antenna resonates with the first wobble mark 211, and a state that the metal antenna resonates with the second wobble mark 212. In the case where the sizes of two marks differ from each other, it is necessary to set the distance between the first wobble mark 211 and the second wobble mark 212 to a value substantially equal to the sum of the diameter of the first wobble mark 211 and the diameter of the second wobble mark 212. A smaller distance between the first wobble mark 211 and the second wobble mark 212 causes a resonance between three particles i.e. the two marks, and the metal antenna 201. This makes it difficult to distinguish a signal to be detected when the metal antenna 201 comes closest to the first wobble mark 211, and a signal to be detected when the metal antenna 201 comes closest to the second wobble mark 212 from each other.

The thus configured information recording medium of the first embodiment mainly has the following configuration.

Specifically, the information recording medium of the first embodiment is provided with a first mark disposed at the center of a track in which information is recorded in the form of arrays, a second mark disposed away from the center of the track in the tracking direction thereof by the predetermined distance b1, and disposed away from the first mark in the direction along the track by the predetermined distance L1, and a third mark disposed away from the center of the track in the tracking direction opposite to the tracking direction of the second mark by the predetermined distance b2, and disposed away from the first mark in the direction along the track by the predetermined distance L2. In this configuration, the second mark and the third mark generate scattered light depending on the distance between a scattering medium provided in an optical information apparatus, and each of the second mark and the third mark by irradiating light onto the scattering medium. Further, the predetermined distance b1 and the predetermined distance b2 are smaller than 50 nm. The difference between the predetermined distance L1 and the predetermined distance L2 is larger than the sum of the length of the first mark in the direction along the track, and the length of the second mark in the direction along the track.

In the above configuration, it is possible to stably perform tracking with respect to a track having a track pitch narrower than the diffraction limit of light.

Figure 18:
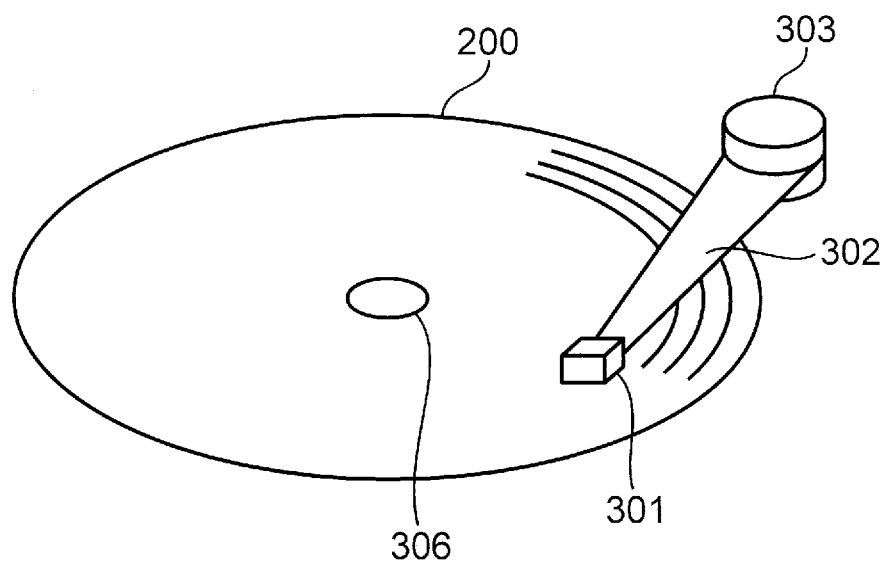
FIG. 18 is an external view showing a configuration example of an optical information apparatus according to the first embodiment.

FIG. 18 is an external view showing a configuration example of the optical information apparatus of the first embodiment. The optical disc 200 is rotated by a motor 306. An optical head 301 is held by an arm 302. The optical head 301 is moved in the radial direction of the optical disc 200 by a motor 303 as a driving mechanism. A tracking signal is generated based on a signal to be output from the optical head 301. The optical head 301 follows the track by driving the motor 303 based on the tracking signal, even if the optical disc 200 is eccentrically rotated.

Figure 19:
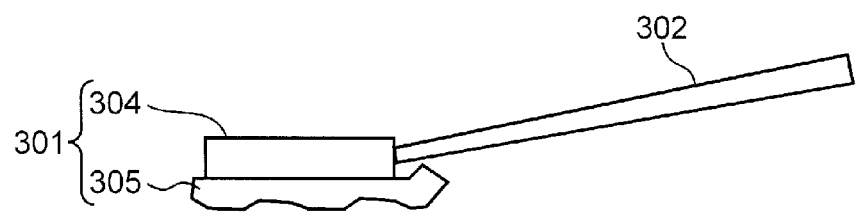
FIG. 19 is an enlarged view showing a configuration of an optical head shown in FIG. 18.

FIG. 19 is an enlarged view showing a configuration of the optical head shown in FIG. 18. The optical head 301 is provided with an optical system holding portion 304 and a slider 305. The slider 305 holds the optical head 301 above the optical disc 200 by a predetermined gap, using a stream of air to be generated by rotation of the optical disc 200.

Figure 20:
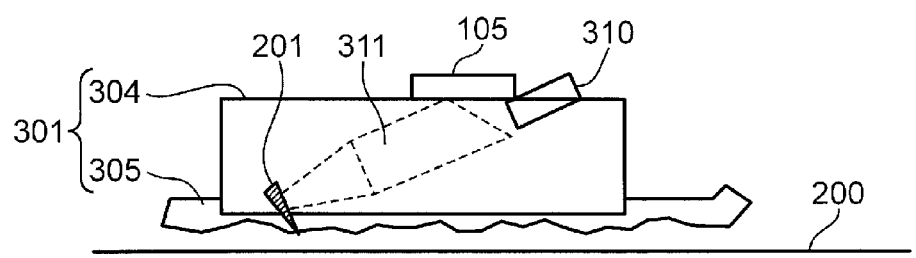
FIG. 20 is a diagram showing a configuration of an optical system holding portion shown in FIG. 19.

FIG. 20 is a diagram showing a configuration of the optical system holding portion shown in FIG. 19. The optical system holding portion 304 is provided with a semiconductor laser 310, a waveguide 311, an metal antenna 201, and a detector 105. A light beam emitted from the semiconductor laser 310 as a light source is irradiated onto the metal antenna 201 as a scattering medium through the waveguide 311. The metal antenna 201 is interacted with the marks on the optical disc 200 as an information recording medium, and the reflectance changes by a resonance phenomenon or the like. Then, the light beam reflected on the metal antenna 201 enters the detector 105 through the waveguide 311 again. The semiconductor laser 310, the waveguide 311, the metal antenna 201, and the detector 105 are held by the optical system holding portion 304.

Figure 21:
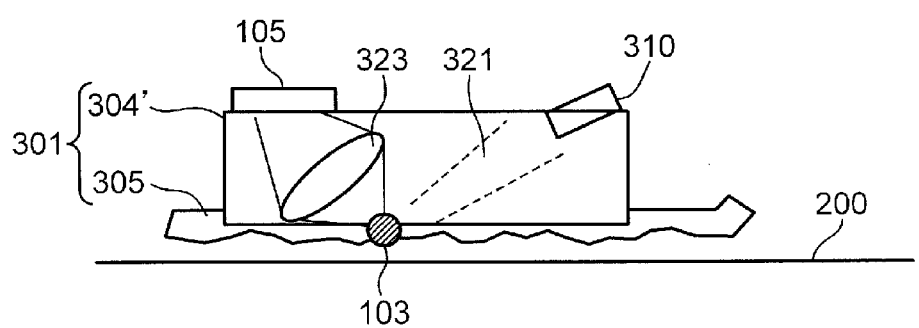
FIG. 21 is a diagram showing another configuration of the optical system holding portion.

FIG. 21 is a diagram showing another configuration of the optical system holding portion. An optical system holding portion 304' is provided with a semiconductor laser 310, a waveguide 321, a scattering medium 103, a lens 323, and a detector 105. A light beam emitted from the semiconductor laser 310 as a light source is irradiated onto the scattering medium 103 through the waveguide 321. The scattering medium 103 is interacted with the marks on the optical disc 200, and generates scattered light depending on the distance thereof with respect to each of the marks. Scattered light generated near the scattering medium 103 is collected on the lens 323, and enters the detector 105. The semiconductor laser 310, the waveguide 321, the scattering medium 103, the lens 323, and the detector 105 are held by the optical system holding portion 304'.

In this embodiment, there has been described an example, in which an optical disc is provided with two wobble marks. Alternatively, three or more than three wobble marks may be formed, and a tracking signal may be generated by integrating the signals to be obtained based on these wobble marks.

In this embodiment, there has been described an example, in which a metal antenna is used as a scattering medium. The material of the scattering medium is not limited to a metal. As far as the material is capable of binding to a mark and causing a resonance at the time of irradiation of light, a material other than the metals such as diamond-like carbon or carbon nanotube may be used. The modification is advantageous in avoiding transformation such as oxidation, unlike a metal, and in enhancing the strength.

Further, in the embodiment, there has been described an example, in which gold is used as a material of the metal antenna. The material is not limited to gold, but other metals such as silver, platinum, copper, or aluminum may be used. The dielectric constant of metal differs depending on the types of metals. Use of a different metal may change the relationship between the shape of the metal that resonates and the wavelength (frequency of light). Accordingly, the embodiment is advantageous in preferentially using a metal having a size or shape that is easily processable, and in increasing the degree of freedom of use.

Further, in the embodiment, there have been described examples, in which the scattering medium has a spherical shape and a triangular prismatic shape, as examples of the shape of the scattering medium. The invention is not specifically limited to the above. In the following, there are described a variety of shapes of the scattering medium.

Figure 22:
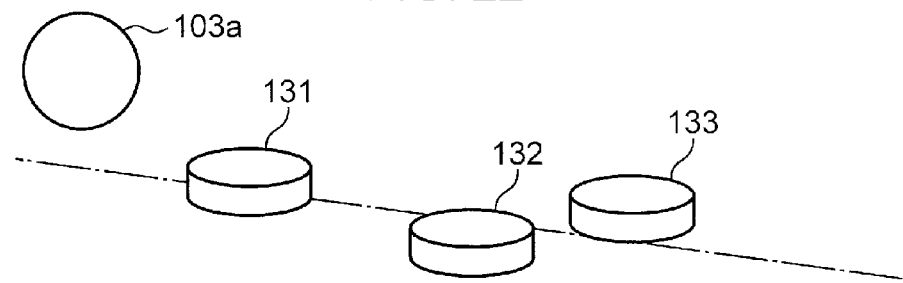
FIG. 22 is a diagram showing a scattering medium in the shape of a sphere.
Figure 23:
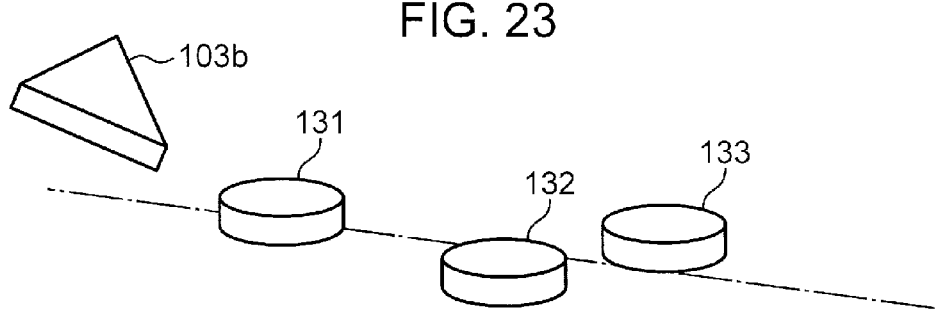
FIG. 23 is a diagram showing a scattering medium in the shape of a triangular prism.
Figure 24:
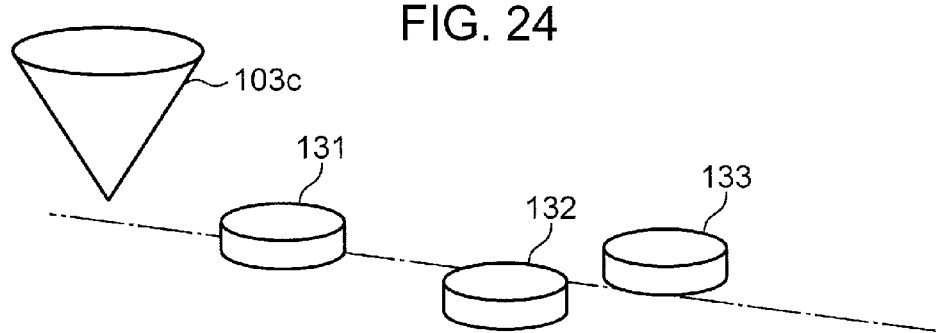
FIG. 24 is a diagram showing a scattering medium in the shape of a cone.
Figure 25:
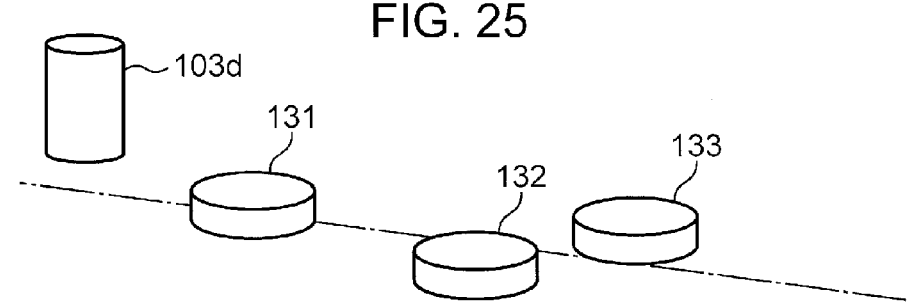
FIG. 25 is a diagram showing a scattering medium in the shape of a column.

FIG. 22 is a diagram showing a scattering medium in the shape of a sphere. As shown in FIG. 22, a scattering medium 103a may have a spherical shape. FIG. 23 is a diagram showing a scattering medium in the shape of a triangular prism. As shown in FIG. 23, a scattering medium 103b may have a triangular prismatic shape. FIG. 24 is a diagram showing a scattering medium in the shape of a cone. As shown in FIG. 24, a scattering medium 103c may have a conical shape. FIG. 25 is a diagram showing a scattering medium in the shape of a column. As shown in FIG. 25, a scattering medium 103d may have a columnar shape.

Figure 26:
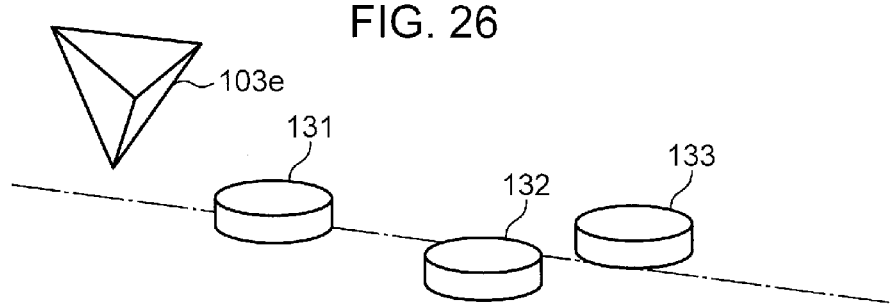
FIG. 26 is a diagram showing a scattering medium in the shape of a triangular pyramid.
Figure 27:
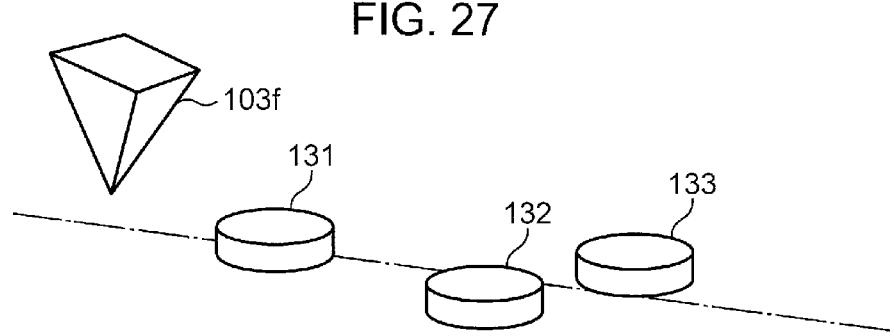
FIG. 27 is a diagram showing a scattering medium in the shape of a quadrangular pyramid.
Figure 28:
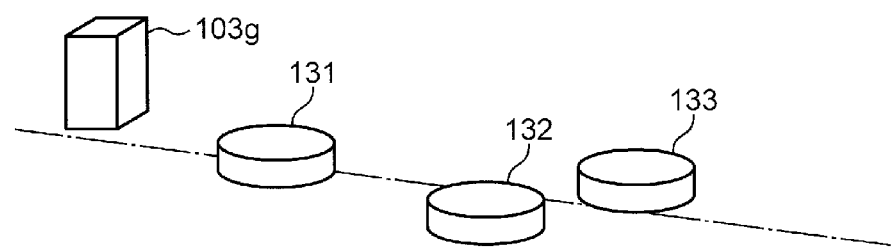
FIG. 28 is a diagram showing a scattering medium in the shape of a rectangular parallelepiped.
Figure 29:
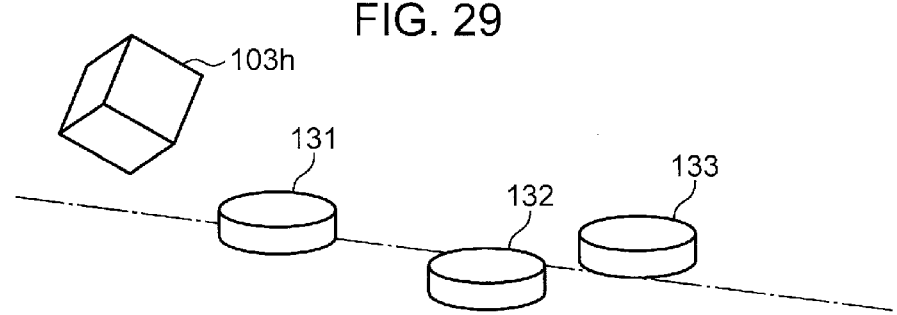
FIG. 29 is a diagram showing a scattering medium in the shape of a cube.
Figure 30:
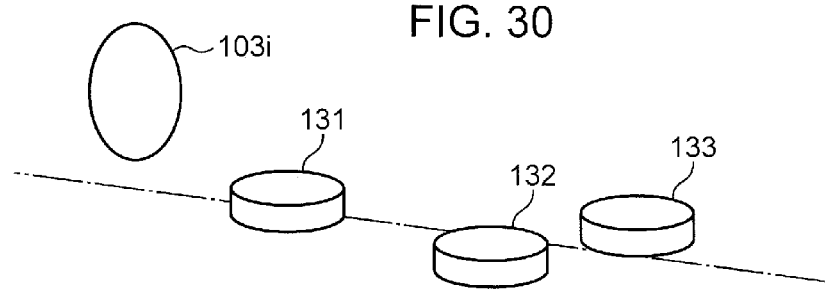
FIG. 30 is a diagram showing a scattering medium in the shape of an elongated ellipse.

FIG. 26 is a diagram showing a scattering medium in the shape of a triangular pyramid. As shown in FIG. 26, a scattering medium 103e may have a triangular pyramidal shape. FIG. 27 is a diagram showing a scattering medium in the shape of a quadrangular pyramid. As shown in FIG. 27, a scattering medium 103f may have a quadrangular pyramidal shape. FIG. 28 is a diagram showing a scattering medium in the shape of a rectangular parallelepiped. As shown in FIG. 28, a scattering medium 103g may have a rectangular parallelepiped shape. FIG. 29 is a diagram showing a scattering medium in the shape of a cube. As shown in FIG. 29, a scattering medium 103h may have a cubic shape. FIG. 30 is a diagram showing a scattering medium in the shape of an elongated ellipse. As shown in FIG. 30, a scattering medium 103i may have an ellipsoidal shape.

As described above, the scattering medium may have a conical shape, a columnar shape, a triangular pyramidal shape, a quadrangular pyramidal shape, a rectangular parallelepiped shape, a cubic shape, or an ellipsoidal shape.

Figure 31:
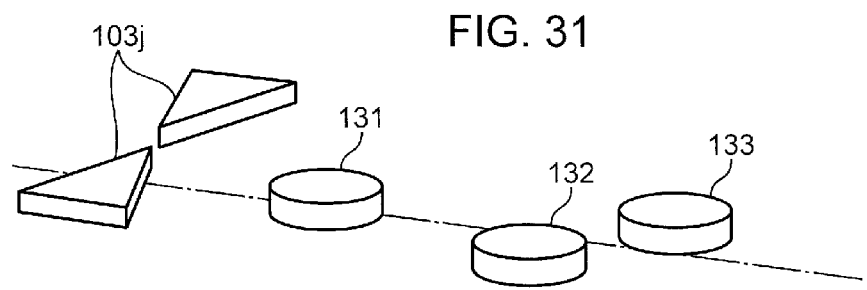
FIG. 31 is a diagram showing a scattering medium in the shape of a bowtie.
Figure 32:
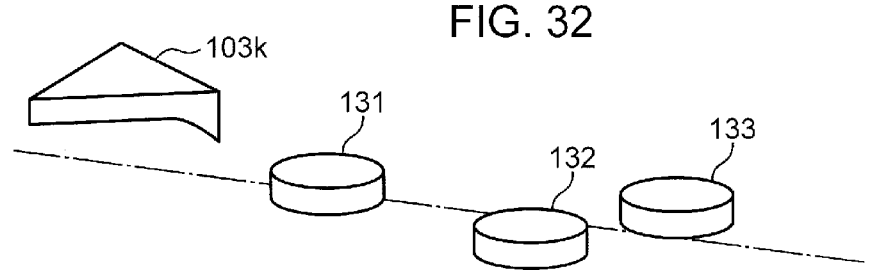
FIG. 32 is a diagram showing a scattering medium in the shape of a bird's beak.
Figure 33:
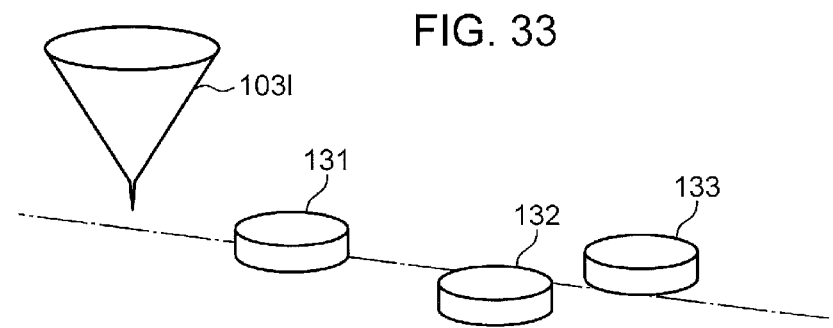
FIG. 33 is a diagram showing a scattering medium having such a shape that the tip end of a cone is pointed like a needle.

FIG. 31 is a diagram showing a scattering medium in the shape of a bowtie. As shown in FIG. 31, a scattering medium 103j may have a bowtie shape such that two triangular prisms face each other. FIG. 32 is a diagram showing a scattering medium in the shape of a bird's beak. As shown in FIG. 32, a scattering medium 103k may have a bird's beak shape such that the tip end of a triangular prism is pointed like a bird's beak. FIG. 33 is a diagram showing a scattering medium having such a shape that the tip end of a cone is pointed like a needle. As shown in FIG. 33, a scattering medium 103l may have such a shape that the tip end of a cone is pointed like a needle.

Further, in this embodiment, a scattering medium is disposed in an uncovered state. As far as the scattering medium is made of a material that does not block the resonance by binding to a mark, the scattering medium may be covered by a protective layer.

Figure 34:
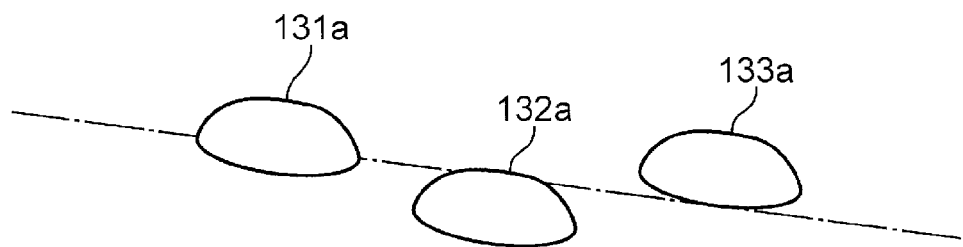
FIG. 34 is a diagram showing a mark in the shape of an elongated hemisphere.
Figure 35:
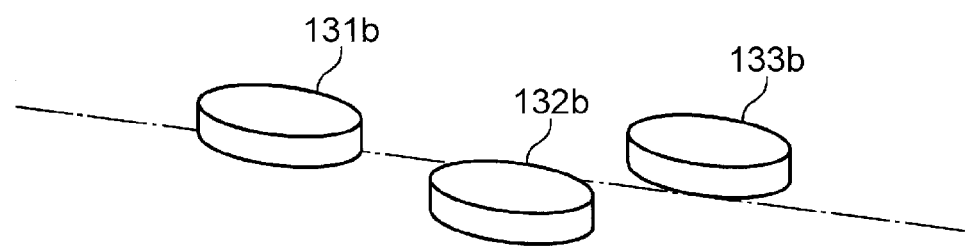
FIG. 35 is a diagram showing a mark in the shape of an elongated column.

Further, in this embodiment, there have been described examples, in which the mark has a hemispherical shape and a columnar shape, as examples of the shape of the mark. The invention is not specifically limited to the above. FIG. 34 is a diagram showing a mark in the shape of an elongated hemisphere. As shown in FIG. 34, a trigger mark 131a, a first wobble mark 132a, and a second wobble mark 133a may have an elongated hemispherical shape (a dome-like shape in which the bottom surface has an elliptical shape). FIG. 35 is a diagram showing a mark in the shape of an elongated column. As shown in FIG. 35, a trigger mark 131b, a first wobble mark 132b, and a second wobble mark 133b may have an elongated columnar shape (a pillar-like shape in which the bottom surface has an elliptical shape).

Further, in this embodiment, the trigger mark 131b, the first wobble mark 132b, and the second wobble mark 133b are identical to each other in shape, but may be different from each other in shape. Further, only the trigger mark 131b may have a different shape among the trigger mark 131b, the first wobble mark 132b, and the second wobble mark 133b.

Further, as well as the scattering medium, as far as the mark is made of a material that does not block the resonance by binding to the scattering medium, the mark may be covered by a protective layer. Specifically, the trigger mark (first mark), the first wobble mark (second mark), and the second wobble mark (third mark) may include a metal layer (metal film).

Further, in this embodiment, there has been described an example, in which a mark includes a film made of gold. As far as the mark is made of a material that causes a resonance by binding to the scattering medium at the time of irradiation of light, the material is not limited to gold. The mark may include a film made of other metals such as silver, platinum, copper, or aluminum, or may include a film made of a material other than the metals.

The thus configured information recording medium can perform high-density recording, can be used as a non-volatile memory, and can be used as an information recording medium for video recording.

In this embodiment, the trigger marks 131, 164, 210, 131a, 131b correspond to an example of a first mark, the first wobble marks 132, 165, 211, 132a, 132b correspond to an example of a second mark, the second wobble marks 133, 166, 212, 133a, 133b correspond to an example of a third mark, the scattering media 103, 103a to 103l, and the metal antenna 201 correspond to an example of a scattering medium, the motor 306 corresponds to an example of a moving section, the timing signal generating circuit 141 corresponds to an example of a detecting section, the first sample and hold circuit 143 corresponds to an example of a first holding section, the second sample and hold circuit 144 corresponds to an example of a second holding section, and the difference computing circuit 145 corresponds to an example of a tracking signal calculating section.

Figure 36:
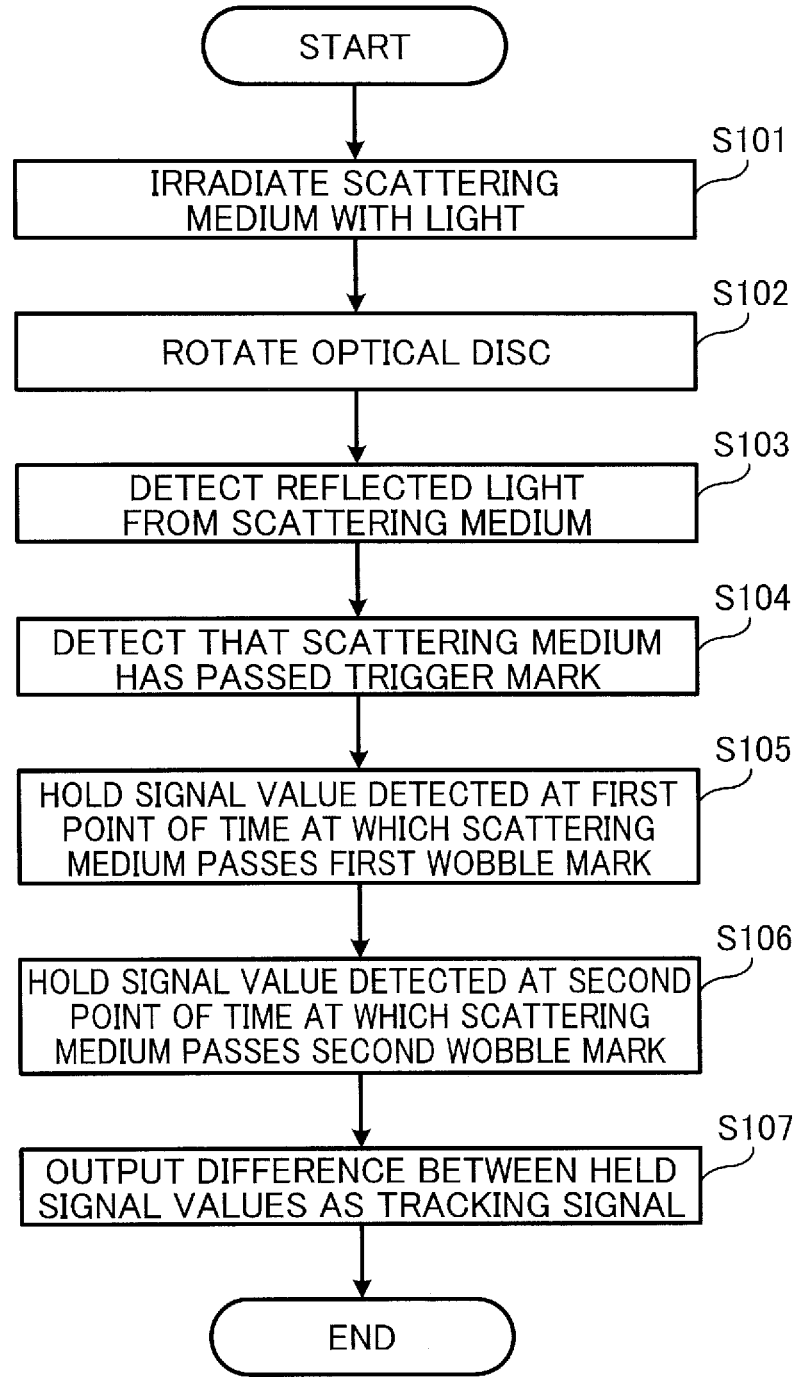
FIG. 36 is a flowchart for describing a tracking method according to the first embodiment.

Next, a tracking method of the embodiment is described. FIG. 36 is a flowchart for describing the tracking method of the first embodiment. As a configuration of the information recording medium, there is used the optical disc 120 described as the information recording medium referring to FIG. 10A in the first embodiment, and a tracking signal is acquired by detecting the interaction with the scattering medium 103. Further, as a configuration of the optical information apparatus, there is used the optical information apparatus shown in FIG. 11, and FIGS. 18 to 21.

Firstly, in Step S101, the semiconductor laser (light source) 310 irradiates the scattering medium 103 with light. Then, in Step S102, the motor 306 rotates the optical disc (information recording medium) 200 at a velocity v. By the above operation, the scattering medium 103 is moved in the direction along a track on the optical disc 200 at a relative velocity v. Then, in Step S103, the detector 105 detects scattered light generated when the scattering medium 103 and a mark on the optical disc (information recording medium) 200 come close to each other.

Then, in Step S104, the timing signal generating circuit 141 detects that the scattering medium 103 has passed the trigger mark 131 as a first mark.

Then, in Step S105, the timing adjusting circuit 142 starts measuring a time from the point of time at which the scattering medium 103 has passed the trigger mark 131, and calculates a first point of time $t1=L1/v$ at which the scattering medium 103 passes by the first wobble mark 132, as a second mark, (which is disposed away from the trigger mark 131 in the direction along the track by the distance L1). At the calculated first point of time t1, the timing adjusting circuit 142 outputs a sampling pulse to the first sample and hold circuit 143. Upon receiving the sampling pulse from the timing adjusting circuit 142, the first sample and hold circuit 143 holds the signal value detected by the detector 105. In this way, the first sample and hold circuit 143 holds, as a first signal value, the signal value detected depending on the distance between the scattering medium 103 and the first wobble mark 132 at the first point of time $t1=L1/v$ at which the scattering medium 103 passes by the first wobble mark 132, after it is detected that the scattering medium 103 has passed the trigger mark 131 by the detector 105.

Then, in Step S106, the timing adjusting circuit 142 calculates a second point of time $t2=L2/v$ at which the scattering medium 103 passes by the second wobble mark 133, as a third mark, (which is disposed away from the trigger mark 131 in the direction along the track by the distance L2). At the calculated second point of time t2, the timing adjusting circuit 142 outputs a sampling pulse to the second sample and hold circuit 144. Upon receiving the sampling pulse from the timing adjusting circuit 142, the second sample and hold circuit 144 holds the signal value detected by the detector 105. In this way, the second sample and hold circuit 144 holds, as a second signal value, the signal value detected depending on the distance between the scattering medium 103 and the second wobble mark 133 at the second point of time $t2=L2/v$ at which the scattering medium 103 passes by the second wobble mark 133, after it is detected that the scattering medium 103 has passed the trigger mark 131 by the detector 105.

Then, in Step S107, the difference computing circuit 145 calculates a difference between the signal value held by the first sample and hold circuit 143, and the signal value held by the second sample and hold circuit 144, and outputs the difference as a tracking signal. By the above operation, it is possible to obtain a tracking signal.

The thus configured tracking method of the embodiment mainly has the following configuration.

Specifically, in the tracking method of the embodiment, the information recording medium is provided with a first mark disposed at the center of a track, a second mark disposed away from the center of the track in the tracking direction thereof by the predetermined distance b1, and disposed away from the first mark in the direction along the track by the predetermined distance L1, and a third mark disposed away from the center of the track in the tracking direction opposite to the tracking direction of the second mark by the predetermined distance b2, and disposed away from the first mark in the direction along the track by the predetermined distance L2. In this configuration, the second mark and the third mark generate scattered light depending on the distance between a scattering medium provided in the optical information apparatus, and each of the second mark and the second mark by irradiating light onto the scattering medium. Further, the predetermined distance b1 and the predetermined distance b2 are smaller than 50 nm. The difference between the predetermined distance L1 and the predetermined distance L2 is larger than the sum of the length of the first mark in the direction along the track, and the length of the second mark in the direction along the track.

The tracking method of the embodiment includes a moving step of moving the scattering medium in the direction along the track at a predetermined relative velocity v; a detecting step of detecting that the scattering medium has passed the first mark, a first holding step of holding, as a first signal value, a signal value detected depending on the distance between the scattering medium and the second mark at the first point of time $t1=L1/v$ at which the scattering medium passes by the second mark, after it is detected that the scattering medium has passed the first mark in the detecting step; a second holding step of holding, as a second signal value, a signal value detected depending on the distance between the scattering medium and the third mark at the second point of time $t2=L2/v$ at which the scattering medium passes by the third mark, after it is detected that the scattering medium has passed the first mark in the detecting step; and a tracking signal calculating step of calculating a difference between the first signal value and the second signal value, as a tracking signal.

According to the method of the embodiment, it is possible to stably generate a tracking signal even with respect to a track having a track pitch narrower than the diffraction limit of light, thereby enhancing the recording density of information.

In the foregoing embodiment, there has been described an example, in which the information recording medium has a disc shape, and tracks are formed in the rotating direction of the disc. The tracking method of the embodiment is not limited to the above. It is possible to perform tracking control with use of the first and second wobble marks as described in the first embodiment or will be described in the second embodiment in order to scan tracks arranged in a one dimensional manner by an optical head. For instance, the tracking method of the embodiment is also applicable to scanning and positioning a probe in probe microscopy. Specifically, it is possible to dispose samples as an object to be measured in the form of tracks, and to measure the samples while sequentially scanning the samples.

Second Embodiment

Figure 37:
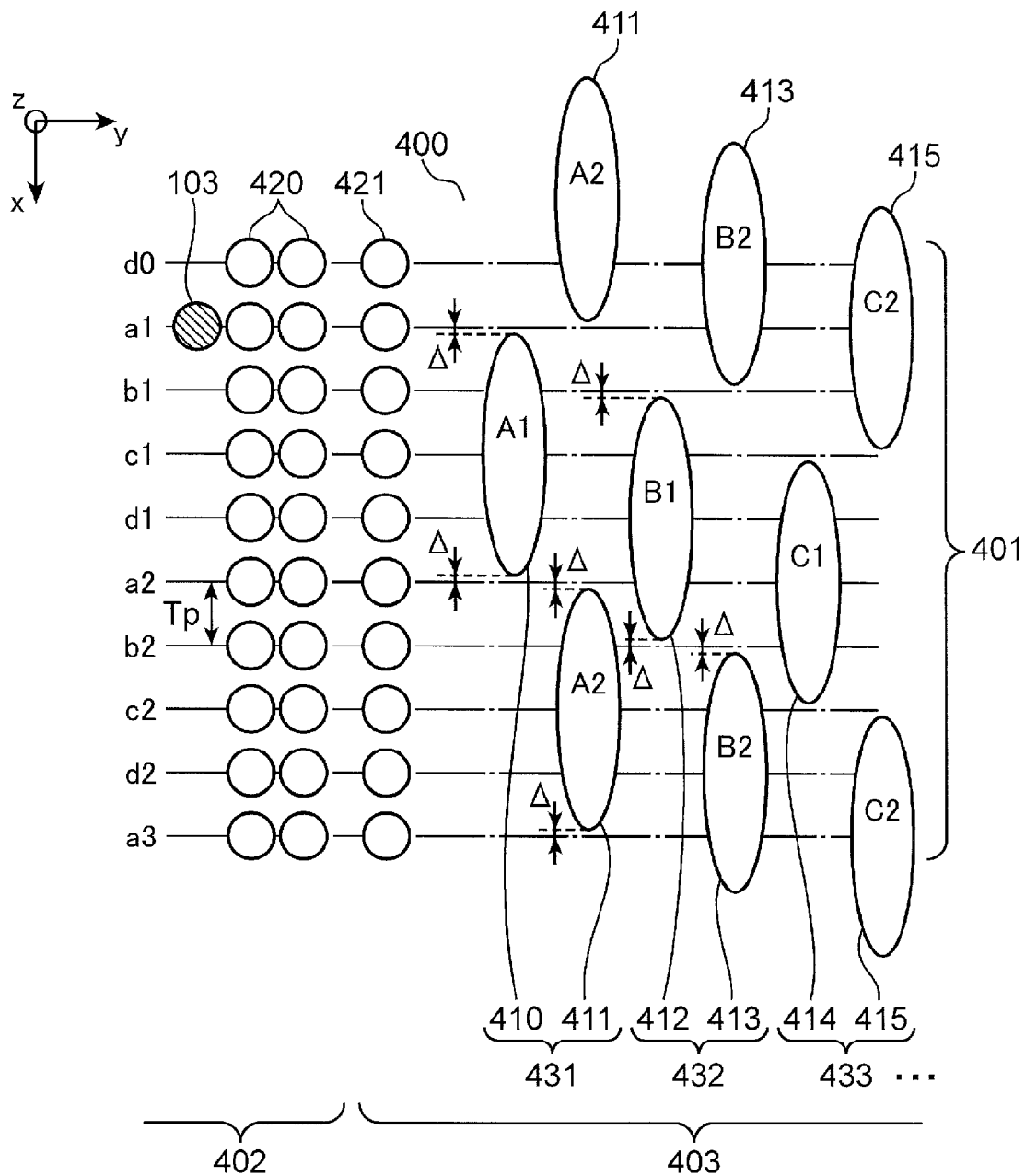
FIG. 37 is a partially enlarged top plan view showing an information recording medium according to a second embodiment.

In this section, an information recording medium according to the second embodiment is described. FIG. 37 is a partially enlarged top plan view of the information recording medium of the second embodiment. In the partially enlarged view of FIG. 37, track groups 401 and a tracking servo area 403 on an optical disc 400 as the information recording medium are illustrated.

In this embodiment, there is described an example, in which each of tracking marks 410, 411, 412, 413, 414, and 415 is larger than the track pitch in a data area 402. In the case where each of the tracking marks 410 to 415 is larger than the track pitch Tp in the track groups 401 in the data area 402, disposing the marks in the tracking direction with respect to each of the tracks results in disposing the marks in an overlapping state. As a result, it is impossible to properly dispose the marks. In order to solve the above drawback, tracks are classified into track groups, and tracking marks are disposed for each of the track groups. In FIG. 37, only the tracking marks belonging to a first mark group 431, a second mark group 432, and a third mark group 433 are illustrated.

The optical disc 400 is provided with data areas 402 and servo areas 403. In each of the data areas 402, information is recorded by data marks 420 in the form of arrays. In each of the servo areas 403, trigger marks 421, first wobble marks 410, and second wobble marks 411 for use in tracking servo control are formed.

The optical disc 400 is provided with the trigger marks 421, the first wobble marks 410, and the second wobble marks 411. Each trigger mark 421 plays a role as a trigger for starting tracking control, and serves as a reference for determining timings at which a scattering medium passes by the corresponding first wobble mark 410 and by the corresponding second wobble mark 411. Each trigger mark 421 is disposed at the center of the corresponding track.

The first wobble mark 410 is disposed to have an edge at a position away from the center of the corresponding track in the tracking direction thereof by a predetermined distance $\Delta$. The second wobble mark 411 is disposed to have an edge at a position away from the center of the track in the tracking direction opposite to the tracking direction of the first wobble mark 410 by the predetermined distance $\Delta$. The width of the first wobble mark 410 in the tracking direction thereof and the width of the second wobble mark 411 in the tracking direction thereof are larger than the track pitch. The first wobble mark 410 and the second wobble mark 411 generate scattered light depending on the distance between a scattering medium 103 provided in an optical information apparatus, and the edge of each of the first wobble mark and the second wobble mark by irradiating light onto the scattering medium. The predetermined distance $\Delta$ is smaller than 50 nm.

Further, the first wobble marks 410 and the second wobble marks 411 are classified into wobble mark groups depending on the distance from the corresponding trigger marks 421. A first wobble mark 410 and a second wobble mark 411 belonging to a same group are disposed repeatedly at a predetermined interval.

The data marks 420 in each of the data areas 402 may be formed by self organization, and each one of the first wobble marks 410 and each one of the second wobble marks 411 may set out the corresponding data marks 420 in forming the data marks 420 by self organization for restricting the configuration of the data marks 420.

The first wobble mark 410 and the second wobble mark 411 in the first mark group 431 are formed over eight tracks. The first wobble mark 410 has one of the edges in the tracking direction thereof away from the center of the track a1 by the predetermined distance $\Delta$ in the tracking direction, is formed over the three tracks b1, c1, and d1, and has the other of the edges in the tracking direction thereof away from the center of the track a2 by the predetermined distance $\Delta$ in the tracking direction. The second wobble mark 411 has one of the edges in the tracking direction thereof away from the center of the track a2 by the predetermined distance $\Delta$ in the tracking direction, is formed over the three tracks b2, c2, and d2, and has the other of the edges in the tracking direction thereof away from the center of the track a3 by the predetermined distance $\Delta$ in the tracking direction.

In the first mark group 431, combination of the first wobble mark 410 and the second wobble mark 411 is repeatedly disposed in the tracking direction.

Likewise, the first wobble mark 412 and the second wobble mark 413 in the second mark group 432 are formed over eight tracks. The first wobble mark 412 has one of the edges in the tracking direction thereof away from the center of the track b1 by the predetermined distance $\Delta$ in the tracking direction, is formed over the three tracks c1, d1, and a2, and has the other of the edges in the tracking direction thereof away from the center of the track b2 by the predetermined distance $\Delta$ in the tracking direction. The second wobble mark 413 has one of the edges in the tracking direction thereof away from the center of the track b2 by the predetermined distance $\Delta$ in the tracking direction, is formed over the three tracks c2, d2, and a3, and has the other of the edges in the tracking direction thereof away from the center of the track b3 (not shown) by the predetermined distance $\Delta$ in the tracking direction.

In the second mark group 432, combination of the first wobble mark 412 and the second wobble mark 413 is repeatedly disposed in the tracking direction.

Further, the first wobble mark 414 and the second wobble mark 415 in the third mark group 433 are disposed in the same manner as the first wobble mark 410 and the second wobble mark 411 in the first mark group 431; and a first wobble mark and a second wobble mark in a fourth mark group (not shown) are disposed in the same manner as the first wobble mark 410 and the second wobble mark 411 in the first mark group 431.

In the third mark group 433, combination of the first wobble mark 414 and the second wobble mark 415 is repeatedly disposed in the tracking direction. In the fourth mark group, combination of the first wobble mark and the second wobble mark is repeatedly disposed in the tracking direction.

The first wobble mark 412 and the second wobble mark 413 in the second mark group 432 are disposed to be displaced from the first wobble mark 410 and the second wobble mark 411 in the first mark group 431 by a distance corresponding to one track in the tracking direction. Further, the first wobble mark 414 and the second wobble mark 415 in the third mark group 433 are disposed to be displaced from the first wobble mark 412 and the second wobble mark 413 in the second mark group 432 by a distance corresponding to one track in the tracking direction. Furthermore, the first wobble mark and the second wobble mark in the fourth mark group are disposed to be displaced from the first wobble mark 414 and the second wobble mark 415 in the third mark group 433 by a distance corresponding to one track in the tracking direction.

With the provision of the thus configured mark groups, for instance, it is possible to obtain a tracking signal with respect to the track a2 with use of the edge of the first wobble mark 410 and the edge of the second wobble mark 411, and it is possible to obtain a tracking signal with respect to the track b2 with use of the edge of the first wobble mark 412 and the edge of the second wobble mark 413. Since one of the first mark group to the fourth mark group corresponds to one of the tracks without fail, it is possible to obtain a tracking signal with respect to any of the tracks.

A sampling method to be employed in causing the scattering medium 103 to pass the trigger mark 421 and to pass by the edge of each of the first wobble mark and the second wobble mark is substantially the same as described referring to FIG. 10A and FIG. 10B. Accordingly, description on the sampling method in this embodiment is omitted. However, since the tracks are classified into track groups, a predetermined distance L1 and a predetermined distance L2 differ depending on the types of the track groups. In view of the above, a timing adjusting circuit 142 generates a timing pulse whose timing is adjusted by advancing or delaying the point of time at which the scattering medium passes a wobble mark depending on the distance from the trigger mark 421, which differs depending on the types of the track groups.

Specifically, firstly, a motor 306 moves the scattering medium 103 in the direction along the corresponding track at a predetermined velocity v. Then, a timing signal generating circuit 141 detects that the scattering medium 103 has passed the corresponding trigger mark 421. Then, a first sample and hold circuit 143 holds, as a first signal value, a signal value detected depending on the distance between the scattering medium 103 and the edge of the first wobble mark 410 at the first point of time t1=L1/v at which the scattering medium 103 passes by the edge of the first wobble mark 410, after it is detected that the scattering medium 103 has passed the trigger mark 421 by the timing signal generating circuit 141. The distance L1 from the trigger mark 421 to the edge of the first wobble mark 410 in the direction along the track is stored in advance.

Then, a second sample and hold circuit 144 holds a signal value detected depending on the distance between the scattering medium 103 and the edge of the second wobble mark 411, as a second signal value, at the second point of time t2=L2/v at which the scattering medium 103 passes by the edge of the second wobble mark 411, after the timing signal generating circuit 141 detects that the scattering medium 103 has passed the trigger mark 421. The distance L2 from the trigger mark 421 to the edge of the second wobble mark 411 in the direction along the track is stored in advance.

Then, a difference computing circuit 145 calculates the first signal value held by the first sample and hold circuit 143, and the second signal value held by the second sample and hold circuit 144, as a tracking signal.

Likewise, a distance L3 between the corresponding trigger mark 421 and the edge of the first wobble mark 412, and a distance L4 between the corresponding trigger mark 421 and the edge of the second wobble mark 413 are respectively stored in advance. In the case where the second wobble mark group 432 is detected, the timing adjusting circuit 142 calculates timings based on the pre-stored distances L3 and L4. Likewise, timings are calculated for the wobble mark groups thereafter in the same manner as described above.

In the configuration of this embodiment, the tracking marks are larger than the data marks in the data area. Accordingly, it is possible to form the tracking marks using photolithography such as an electron beam (EB) lithography method, a focus ion beam (FIB) method, or an ultraviolet exposure method, which makes it easy to form the marks. Thus, it is possible to obtain a stable tracking signal even in a data area, in which marks are formed with a small track pitch.

Further, it is also possible to identify tracking marks using a conventional light spot, because it is possible to increase the size of the tracking marks as described above. In the above configuration, tracking control may be performed with use of a light spot formed by collecting light of a size close to the diffraction limit by a conventional optical head, and information recording or reproducing may be carried out with use of a metal antenna as a scattering medium. The light spot in the above configuration may be the one formed by collecting light emitted from an end of an optical waveguide for irradiating a scattering medium with light.

In the embodiment, there has been described an example, in which tracking marks are classified into four mark groups. The invention is not limited to the above. The tracking marks may be classified into two mark groups or three mark groups, or may be classified into five or more mark groups.

In the embodiment, the trigger mark 421 corresponds to an example of a first mark, the first wobble mark 410 corresponds to an example of a second mark, the second wobble mark 411 corresponds to an example of a third mark, the scattering medium 103 corresponds to an example of a scattering medium, and the data mark 420 corresponds to an example of a recording mark.

Third Embodiment

Figure 38:
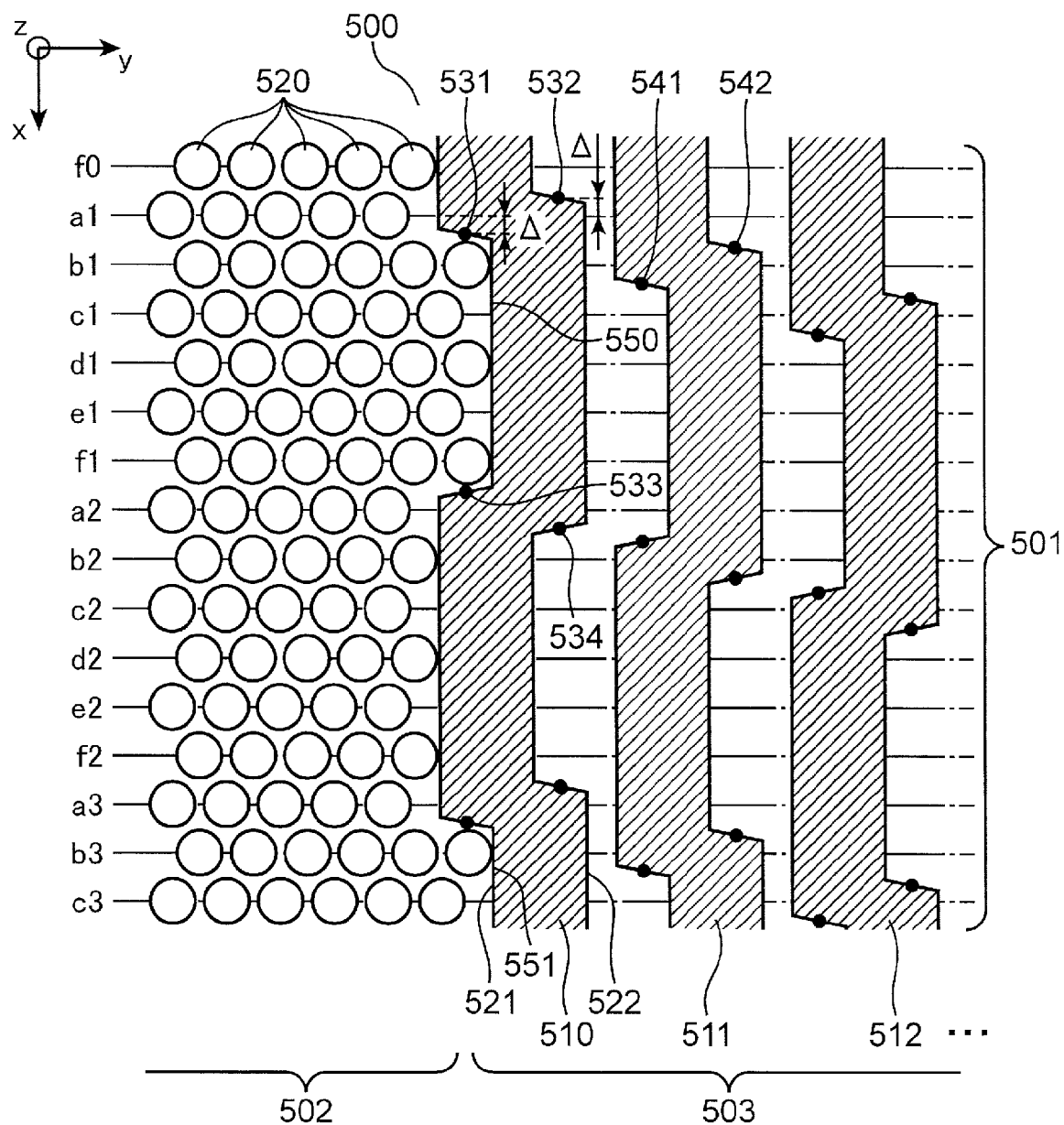
FIG. 38 is a partially enlarged top plan view showing an information recording medium according to a third embodiment.

In this section, an information recording medium according to the third embodiment is described. FIG. 38 is a partially enlarged top plan view of the information recording medium of the third embodiment. In the partially enlarged view of FIG. 38, track groups 501 and a servo area 503 for use in tracking control on an optical disc 500 as the information recording medium are illustrated.

The optical disc 500 is provided with data areas 502 and servo areas 503. In each of the data areas 502, information is recorded by data marks 520 in the form of arrays. In each of the servo areas 503, guide marks 510, 511, and 512 for use in forming the data marks 520 and for use in tracking servo control are formed.

The optical disc 500 is provided with the data marks 520, and the guide marks 510, 511, and 512. An array of the data marks 520 is disposed at the center of the corresponding track, and formed by self organization. The guide marks 510, 511, and 512 are so formed as to restrict the configuration of the data marks 520 so that the data marks 520 are disposed at respective predetermined positions in forming the data marks 520 by self organization.

The guide mark 510 has a first bent portion 531 for use in restricting the configuration of the data marks 520 to be formed by self organization on the data area side where the data marks 520 are disposed, and a second bent portion 532 that makes a pair with the first bent portion 531 on the side opposite to the data area side.

The first bent portion 531 is formed at a position away from the center of the corresponding track in the tracking direction thereof by a predetermined distance Δ. The second bent portion 532 is formed at a position away from the center of the track in the tracking direction opposite to the tracking direction of the first bent portion 531 by the predetermined distance Δ. The first bent portion 531 and the second bent portion 532 generate scattered light depending on the distance between a scattering medium 103 provided in an optical information apparatus, and each of the first bent portion and the second bent portion by irradiating light onto the scattering medium. The predetermined distance Δ is smaller than 50 nm.

The optical disc 500 includes first guide marks 510, and second guide marks 511 each of which is formed in juxtaposition with the corresponding first guide mark 510 in the direction along the tracks.

The first bent portion 531 of the first guide mark 510, and a first bent portion 541 of the second guide mark 511 are away from each other by a distance corresponding to the track pitch. Likewise, the second bent portion 532 of the first guide mark 510, and a second bent portion 542 of the second guide mark 511 are away from each other by a distance corresponding to the track pitch.

The data marks 520 in the data area 502 are very small, and it is difficult to form the data marks 520 by a conventional photolithography method. In view of the above, there is proposed a method for forming data marks by self organization, with use of a structure configured such that particles are isolated from each other and stabilized with a specific size and shape. In the case where such a self organization method is employed, and the projection shape of a mark has a point symmetry and is analogous to a circular shape, the configuration of the marks is such that each six marks are disposed around one mark. By connecting between the centers of the six marks adjacent to each other, a regular hexagonal shape is formed. It is necessary to form a guide structure in advance in an end portion of the data area from which self organization is started in order to dispose these marks at an intended location in the form of tracks with high density. The first guide mark 510 also has a guide function in forming the data marks by self organization.

An edge 521 of the first guide mark 510 on the data area 502 side has a concave portion 550 of a size substantially corresponding to five tracks i.e. tracks b1, c1, d1, e1, and f1; and has a concave portion 551 succeeding the concave portion 550. The concave portion 551 is configured to start from the position corresponding to a track b3. In this way, the edge 521 of the first guide mark 510 on the data area 502 side has plural concave portions aligned in the tracking direction.

The other edge 522 constituting a pair with the edge 521 of the first guide mark 510 has a complementary shape with respect to the edge 521. Specifically, the first bent portion 531 as a start of a certain concave portion of the edge 521 makes a pair with the second bent portion 532 as an end of a concave portion of the edge 522. The first bent portion 531 and the second bent portion 532 are disposed, with the track a1 being interposed therebetween. Further, a third bent portion 533 as an end of the certain concave portion of the edge 521 makes a pair with a fourth bent portion 534 as a start of a concave portion succeeding the concave portion of the edge 522. The third bent portion 533 and the fourth bent portion 534 are disposed, with the track a2 being interposed therebetween.

In this way, each of the tracks a1, a2, a3, . . . which belong to a first track group "a" among the tracks is interposed between the respective corresponding two bent portions of both edges of the first guide mark 510. Likewise, each of the tracks b1, b2, b3, . . . which belong to a second track group "b" among the tracks is interposed between the respective corresponding two bent portions of both edges of the second guide mark 511. Likewise, each of the tracks belonging to a third track group "c" is interposed between the respective corresponding two bent portions of both edges of a third guide mark; each of the tracks belonging to a fourth track group "d" is interposed between the respective corresponding two bent portions of both edges of a fourth guide mark; each of the tracks belonging to a fifth track group "e" is interposed between the respective corresponding two bent portions of both edges of a fifth guide mark, and each of the tracks belonging to a sixth track group "f" is interposed between the respective corresponding two bent portions of both edges of a sixth guide mark. In FIG. 38, only the first guide mark 510, the second guide mark 511, and the third guide mark 512 are illustrated, but the fourth to sixth guide marks are disposed in the actual information recording medium, although not illustrated.

In the first to sixth guide marks, each two bent portions corresponding to each of the tracks are disposed away from the center of the corresponding track in the tracking directions thereof by the same distance as each other. By the above configuration, in the case where the position of a scattering medium is displaced from the center of a track during a follow-up operation of the track by the scattering medium, the scattering medium is moved toward one of the two bent portions, and is moved away from the other of the two bent portions. It is possible to detect a difference between the distance between the scattering medium and one of the bent portions, and the distance between the scattering medium and the other of the bent portions, as a difference in signal to be obtained based on scattered light from the scattering medium. Specifically, it is possible to obtain a tracking signal by determining timings at which the scattering medium passes the positions most proximal to the two bent portions, sampling and holding two signal values detected at the determined timings, and calculating a difference between the two signal values.

In this section, an operation of the optical information apparatus of the third embodiment is briefly described. Firstly, a motor 306 moves the scattering medium in the direction along the corresponding track at a predetermined relative velocity v. Then, a first sample and hold circuit 143 holds, as a first signal value, a signal value detected depending on the distance between the scattering medium and the first bent portion 531 when the scattering medium passes by the first bent portion 531. In the third embodiment, there is no trigger mark. Accordingly, upon detecting that the scattering medium 103 has passed by the first bent portion 531, a timing signal generating circuit 141 outputs a timing signal to the first sample and hold circuit 143. Upon receiving the timing signal from the timing signal generating circuit 141, the first sample and hold circuit 143 holds the signal value detected by a detector 105, as the first signal value.

Then, a second sample and hold circuit 144 holds, as a second signal value, a signal value detected depending on the distance between the scattering medium and the second bent portion 532 when the scattering medium passes by the second bent portion 532. Upon detecting that the scattering medium 103 has passed by the second bent portion 532, the timing signal generating circuit 141 outputs a timing signal to the second sample and hold circuit 144. Upon receiving the timing signal from the timing signal generating circuit 141, the second sample and hold circuit 144 holds the signal value detected by the detector 105, as the second signal value.

Then, a difference computing circuit 145 calculates a difference between the first signal value held by the first sample and hold circuit 143, and the second signal value held by the second sample and hold circuit 144, as a tracking signal.

In this embodiment, a guide mark serves as a guide member for use in forming data marks by self organization, and as a tracking mark; and the position of the track is determined by the position of the guide mark in forming the data marks by self organization. Thus, the above configuration is advantageous in reducing a positional error between a tracking mark and a track.

In this embodiment, the data mark 520 corresponds to an example of a recording mark, the guide marks 510, 511, and 512 correspond to an example of a guide mark, the first bent portion 531 corresponds to an example of a first bent portion, the second bent portion 532 corresponds to an example of a second bent portion, the scattering medium 103 corresponds to an example of a scattering medium, the first guide mark 510 corresponds to an example of a first guide mark, and the second guide mark 511 corresponds to an example of a second guide mark.

Fourth Embodiment

Figure 39A:
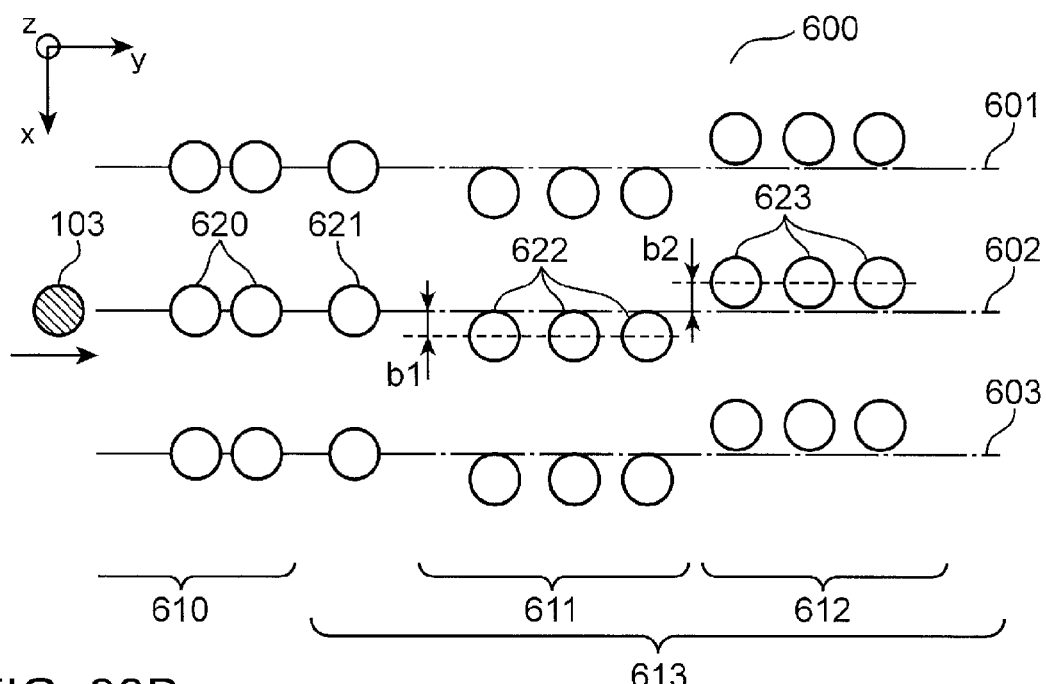
FIG. 39A is a partially enlarged top plan view showing an information recording medium according to a fourth embodiment.
Figure 39B:
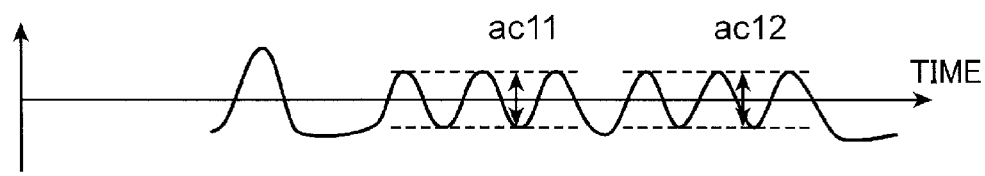
FIG. 39B is a diagram showing a signal to be detected, in the case where a scattering medium moves over the center of the track with respect to the configuration of the marks shown in FIG. 39A.
Figure 40:
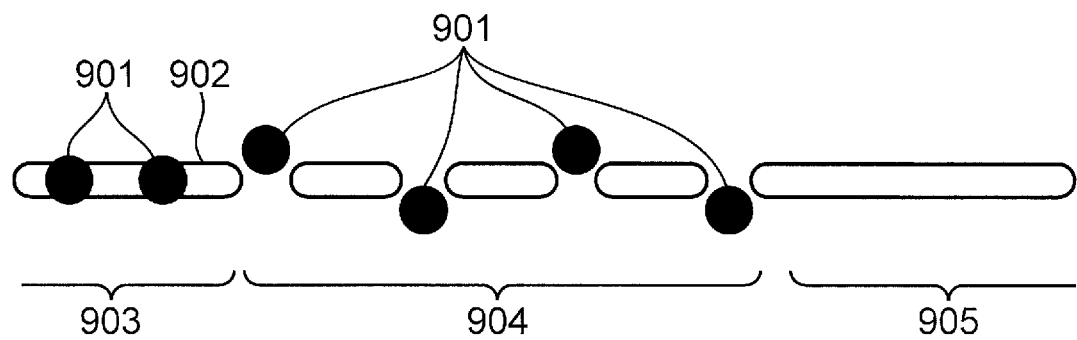
FIG. 40 is a diagram showing an example of pre-wobbled pits in a conventional information recording medium.

In this section, an information recording medium according to the fourth embodiment is described. FIG. 39A is a partially enlarged top plan view of the information recording medium of the fourth embodiment. FIG. 39B is a diagram showing a signal to be detected in the case where a scattering medium moves over the center of a track with respect to the configuration of the marks shown in FIG. 39A.

The partially enlarged view of FIG. 39A shows tracks and a tracking servo area on an optical disc 600 as the information recording medium. In this embodiment, there is described an example, in which first wobble marks and second wobble marks are formed for tracking control.

The optical disc 600 is provided with data areas 610 and servo areas 613. In each of the data areas 610, information is recorded by data marks 620 in the form of arrays. In each of the servo areas 613, trigger marks 621 for use in tracking servo control, first wobble marks 622, and second wobble marks 623 are formed.

The optical disc 600 is provided with the trigger marks 621, the first wobble marks 622, and the second wobble marks 623. Each trigger mark 621 plays a role as a trigger for starting tracking control, and serves as a reference for determining timings at which a scattering medium passes the first wobble marks 622 and the second wobble marks 623. Each trigger mark 621 is disposed at the center of the corresponding track.

The first wobble marks 622 are disposed away from the center of the corresponding track in the tracking direction thereof by a predetermined distance b1, and are disposed in the direction along the track at a predetermined interval. The second wobble marks 623 are disposed away from the center of the track in the tracking direction opposite to the tracking direction of the first wobble marks 622 by a predetermined distance b2, and are disposed in the direction along the track at an interval equal to the interval of the first wobble marks 622.

The first wobble marks 622 and the second wobble marks 623 generate scattered light depending on the distance between a scattering medium 103 provided in an optical information apparatus, and each of the first wobble marks and the second wobble marks by irradiating light onto the scattering medium. The predetermined distance b11 and the predetermined distance b2 are smaller than 50 nm.

Data marks 620 are disposed on each of the tracks within each of the data areas 610. In each of the servo areas 613, the trigger marks 621, a first wobble mark group 611, and a second wobble mark group 612 are disposed. The first wobble marks 622 belonging to the first wobble mark group 611 are disposed away from the center of a track 602 in the tracking direction thereof by the predetermined distance b1, and the second wobble marks 623 belonging to the second wobble mark group 612 are disposed away from the center of the track 602 in the tracking direction opposite to the tracking direction of the first wobble marks 622 by the predetermined distance b2. In this embodiment, the optical disc 600 is configured such that three first wobble marks constitute a first wobble mark group, and three second wobble marks constitute a second wobble mark group.

In the case where the scattering medium 103 moves over the track 602 relative to the trigger mark 621, the first wobble marks 622, and the second wobble marks 623 disposed as described above, a signal shown in FIG. 39B is detected. A tracking signal is generated based on a difference between an amplitude ac11 of an AC signal to be obtained when the scattering medium 103 passes by the first wobble mark group 611, and an amplitude ac12 of the AC signal to be obtained when the scattering medium 103 passes by the second wobble mark group 612. In the case where the scattering medium 103 is displaced from the center of the track, the amplitude of the AC signal to be detected based on the wobble marks toward which the scattering medium 103 has moved increases, and the amplitude of the AC signal to be detected based on the wobble marks from which the scattering medium 103 has moved away decreases. Thus, it is possible to detect an off-track amount including the polarities.

In this section, an operation of the optical information apparatus of the fourth embodiment is briefly described. Firstly, a motor 306 moves the scattering medium 103 in the direction along the corresponding track at a predetermined relative velocity v. Then, a timing signal generating circuit 141 detects that the scattering medium 103 has passed the corresponding trigger mark 621.

Then, upon detecting that the scattering medium 103 has passed the trigger mark 621 by the timing signal generating circuit 141, a first sample and hold circuit 143 holds, as a first signal value, a signal value detected depending on the distance between the scattering medium 103 and the first wobble mark group 611 when the scattering medium 103 passes by the first wobble mark group 611.

A timing adjusting circuit 142 calculates a first point time $t1=L1/v$ at which the scattering medium 103 passes by the leading one of the first wobble marks 622 in the first wobble mark group 611, after it is detected that the scattering medium 103 has passed the trigger mark 421 by the timing signal generating circuit 141. The symbol L1 denotes a distance from the trigger mark 421 to the leading one of the first wobble marks 622 in the first wobble mark group 611. The timing adjusting circuit 142 outputs a sampling pulse to the first sample and hold circuit 143 at the calculated first point of time t1.

Then, a second sample and hold circuit 144 holds, as a second signal value, a signal value detected depending on the distance between the scattering medium 103 and the second wobble mark group 612 when the scattering medium 103 passes by the second wobble mark group 612, after it is detected that the scattering medium 103 has passed the trigger mark 621 by the timing signal generating circuit 141.

The timing adjusting circuit 142 calculates a second point time $t2=L2/v$ at which the scattering medium 103 passes by the leading one of the second wobble marks 623 in the second wobble mark group 612, after it is detected that the scattering medium 103 has passed the trigger mark 421 by the timing signal generating circuit 141. The symbol L2 denotes a distance from the trigger mark 421 to the leading one of the second wobble marks 623 in the second wobble mark group 612. The timing adjusting circuit 142 outputs a sampling pulse to the second sample and hold circuit 144 at the calculated second point of time t2.

Then, a difference computing circuit 145 calculates a difference between the first signal value held by the first sample and hold circuit 143, and the second signal value held by the second sample and hold circuit 144, as a tracking signal.

In this embodiment, an AC-coupled amplifier is used for high-speed signal reproduction, and the amplitude of an AC signal is used even in the case where the DC component of the signal is cut off. Accordingly, it is possible to detect a tracking signal with enhanced precision.

In this embodiment, the trigger mark 621 corresponds to an example of a first mark, the first wobble marks 622 correspond to an example of second marks, the second wobble marks 623 correspond to an example of third marks, and the scattering medium 103 corresponds to an example of a scattering medium.

The foregoing embodiments mainly include the invention having the following features.

An information recording medium according to an aspect of the invention is provided with a first mark disposed at a center of a track; a second mark disposed away from the center of the track in a tracking direction thereof by a predetermined distance b1, and disposed away from the first mark in a direction along the track by a predetermined distance L1; and a third mark disposed away from the center of the track in a tracking direction opposite to the tracking direction of the second mark by a predetermined distance b2, and disposed away from the first mark in the direction along the track by a predetermined distance L2. The second mark and the third mark generate scattered light depending on a distance between a scattering medium provided in an optical information apparatus, and each of the second mark and the third mark by irradiating the scattering medium with light. The predetermined distance b1 and the predetermined distance b2 are smaller than 50 nm. A difference between the predetermined distance L1 and the predetermined distance L2 is larger than a sum of a length of the first mark in the direction along the track, and a length of the second mark in the direction along the track.

According to the above configuration, the information recording medium is provided with the first mark disposed at the center of the track; the second mark disposed away from the center of the track in the tracking direction thereof by the predetermined distance b1, and disposed away from the first mark in the direction along the track by the predetermined distance L1; and the third mark disposed away from the center of the track in the tracking direction opposite to the tracking direction of the second mark by the predetermined distance b2, and disposed away from the first mark in the direction along the track by the predetermined distance L2. The second mark and the third mark generate scattered light depending on the distance between the scattering medium provided in the optical information apparatus, and each of the second mark and the third mark by irradiating the scattering medium with light. The predetermined distance b1 and the predetermined distance b2 are smaller than 50 nm. The difference between the predetermined distance L1 and the predetermined distance L2 is larger than the sum of the length of the first mark in the direction along the track, and the length of the second mark in the direction along the track.

According to the invention, the second mark and the third mark are disposed to be displaced away from each other in the tracking directions opposite to each other, and a tracking signal is generated based on the intensity of scattered light when the scattering medium comes close to the second mark, and based on the intensity of scattered light when the scattering medium comes close to the third mark. Accordingly, it is possible to stably perform tracking with respect to a track having a track pitch narrower than the diffraction limit of light.

An information recording medium according to another aspect of the invention is provided with a first mark disposed at a center of a track; a second mark disposed to have an edge at a position away from the center of the track in a tracking direction thereof by a predetermined distance $\Delta$; and a third mark disposed to have an edge at a position away from the center of the track in a tracking direction opposite to the tracking direction of the second mark by the predetermined distance $\Delta$. A width of the second mark in the tracking direction thereof and a width of the third mark in the tracking direction thereof are larger than a track pitch. The second mark and the third mark generate scattered light depending on a distance between a scattering medium provided in an optical information apparatus, and each of the second mark and the third mark by irradiating the scattering medium with light. The predetermined distance $\Delta$ is smaller than 50 nm.

According to the above configuration, the information recording medium is provided with the first mark disposed at the center of the track; the second mark disposed to have the edge at the position away from the center of the track in the tracking direction thereof by the predetermined distance $\Delta$; and the third mark disposed to have the edge at the position away from the center of the track in the tracking direction opposite to the tracking direction of the second mark by the predetermined distance $\Delta$. The width of the second mark in the tracking direction thereof and the width of the third mark in the tracking direction thereof are larger than the track pitch. The second mark and the third mark generate scattered light depending on the distance between the scattering medium provided in the optical information apparatus, and each of the second mark and the third mark by irradiating the scattering medium with light. The predetermined distance $\Delta$ is smaller than 50 nm.

In the above configuration, the edge of the second mark and the edge of the third mark are disposed to be displaced away from each other in the tracking directions opposite to each other, and a tracking signal is generated based on the intensity of scattered light when the scattering medium comes close to the edge of the second mark, and based on the intensity of scattered light when the scattering medium comes close to the edge of the third mark. Accordingly, it is possible to stably perform tracking with respect to a track having a track pitch narrower than the diffraction limit of light.

Further, in the information recording medium, preferably, the second mark and the third mark may be classified into different groups depending on a distance thereof from the first mark, and the second mark and the third mark belonging to a same group may be repeatedly disposed at a predetermined interval.

According to the above configuration, the second mark and the third mark are classified into the different groups depending on the distance thereof from the first mark, and the second mark and the third mark belonging to the same group are repeatedly disposed at the predetermined interval.

Accordingly, it is possible to dispose all the edges of the second mark and of the third mark whose width in the tracking direction is larger than the track pitch with respect to all the tracks.

Further, preferably, the information recording medium may further include recording marks formed by self organization for recording information.

According to the above configuration, the recording marks for recording information are formed by the self organization. Accordingly, it is possible to form small recording marks for recording the information with high density.

Further, in the information recording medium, preferably, the second mark or the third mark may set out the recording marks in forming the recording marks by the self organization for restricting a configuration of the recording marks.

According to the above configuration, the second mark or the third mark sets out the recording marks in forming the recording marks by the self organization for restricting the configuration of the recording marks.

In the above configuration, the position of the track is determined by the guide position in forming data marks by the self organization. Accordingly, it is possible to reduce a positional error between the second mark or the third mark, and the track.

An information recording medium according to yet another aspect of the invention is provided with recording marks each disposed at a center of a track and formed by self organization for recording information; and a guide mark configured to restrict a configuration of the recording marks so that the recording marks are disposed at respective predetermined positions in forming the recording marks by the self organization. The guide mark has a first bent portion for restricting the configuration of the self-organized recording marks on a data area side where the recording marks are disposed, and a second bent portion which makes a pair with the first bent portion on a side opposite to the data area side. The first bent portion is disposed at a position away from the center of the track in a tracking direction thereof by a predetermined distance Δ. The second bent portion is disposed at a position away from the center of the track in a tracking direction opposite to the tracking direction of the first bent portion by the predetermined distance Δ. The first bent portion and the second bent portion generate scattered light depending on a distance between a scattering medium provided in an optical information apparatus, and each of the first bent portion and the second bent portion by irradiating the scattering medium with light. The predetermined distance Δ is smaller than 50 nm.

According to the above configuration, the information recording medium is provided with the recording marks each disposed at the center of the track and foamed by self organization for recording information; and the guide mark configured to restrict the configuration of the recording marks so that the recording marks are disposed at the respective predetermined positions in forming the recording marks by the self organization. The guide mark has the first bent portion for restricting the configuration of the self-organized recording marks on the data area side where the recording marks are disposed, and the second bent portion which makes a pair with the first bent portion on the side opposite to the data area side. The first bent portion is disposed at the position away from the center of the track in the tracking direction thereof by the predetermined distance Δ. The second bent portion is disposed at the position away from the center of the track in the tracking direction opposite to the tracking direction of the first bent portion by the predetermined distance Δ. The first bent portion and the second bent portion generate scattered light depending on the distance between the scattering medium provided in the optical information apparatus, and each of the first bent portion and the second bent portion by irradiating the scattering medium with light. The predetermined distance Δ is smaller than 50 nm.

In the above configuration, the first bent portion and the second bent portion of the guide mark are disposed to be displaced away from each other in the tracking directions opposite to each other, and a tracking signal is generated based on the intensity of scattered light when the scattering medium comes close to the first bent portion, and based on the intensity of scattered light when the scattering medium comes close to the second bent portion. Accordingly, it is possible to stably perform tracking with respect to a track having a track pitch narrower than the diffraction limit of light.

Further, in the information recording medium, preferably, the guide mark may include a first guide mark, and a second guide mark disposed in juxtaposition with the first guide mark in a direction along the track, the first bent portion of the first guide mark and the first bent portion of the second guide mark may be disposed away from each other by a distance corresponding to a track pitch, and the second bent portion of the first guide mark and the second bent portion of the second guide mark may be disposed away from each other by a distance corresponding to the track pitch.

According to the above configuration, the guide mark includes the first guide mark, and the second guide mark disposed in juxtaposition with the first guide mark in the direction along the track. The first bent portion of the first guide mark and the first bent portion of the second guide mark are disposed away from each other by the distance corresponding to the track pitch. The second bent portion of the first guide mark and the second bent portion of the second guide mark are disposed away from each other by the distance corresponding to the track pitch.

Accordingly, it is possible to dispose the first bent portion and the second bent portion with respect to each of the tracks.

An information recording medium according to yet another aspect of the invention is provided with a first mark disposed at a center of a track; a plurality of second marks disposed away from the center of the track in a tracking direction thereof by a predetermined distance b1, and disposed in a direction along the track at a predetermined interval; and a plurality of third marks disposed away from the center of the track in a tracking direction opposite to the tracking direction of the second marks by a predetermined distance b2, and disposed in the direction along the track at a same interval as the interval of the second marks. The second marks and the third marks generate scattered light depending on a distance between a scattering medium provided in an optical information apparatus and each of the second marks and the third marks by irradiating the scattering medium with light. The predetermined distance b1 and the predetermined distance b2 are smaller than 50 nm.

According to the above configuration, the information recording medium is provided with the first mark disposed at the center of the track; the plurality of the second marks disposed away from the center of the track in the tracking direction thereof by the predetermined distance b1, and disposed in the direction along the track at the predetermined interval; and the plurality of the third marks disposed away from the center of the track in the tracking direction opposite to the tracking direction of the second marks by the predetermined distance b2, and disposed in the direction along the track at the same interval as the interval of the second marks. The second marks and the third marks generate scattered light depending on the distance between the scattering medium provided in the optical information apparatus, and each of the second marks and the third marks by irradiating the scattering medium with light. The predetermined distance b1 and the predetermined distance b2 are smaller than 50 nm.

In the above configuration, the plurality of the second marks and the plurality of the third marks are disposed to be displaced away from each other in the tracking directions opposite to each other, and a tracking signal is generated based on the intensity of scattered light when the scattering medium comes close to the second marks, and based on the intensity of scattered light when the scattering medium comes close to the third marks. Accordingly, it is possible to stably perform tracking with respect to a track having a track pitch narrower than the diffraction limit of light.

Further, in the information recording medium, preferably, the scattering medium may be made of a metal. According to this configuration, since the scattering medium is made of a metal, it is possible to process the scattering medium with ease, and to preferentially use a metal of a kind depending on an intended resonance state.

Further, in the information recording medium, preferably, a shape of the scattering medium may include a spherical shape. According to this configuration, since the shape of the scattering medium includes the spherical shape, it is possible to preferentially use a scattering medium of a shape depending on an intended resonance state.

Further, in the information recording medium, preferably, a shape of the scattering medium may include a columnar shape. According to this configuration, since the shape of the scattering medium includes the columnar shape, it is possible to preferentially use a scattering medium of a shape depending on an intended resonance state.

Further, in the information recording medium, preferably, a shape of the scattering medium may include a triangular pyramidal shape. According to this configuration, since the shape of the scattering medium includes the triangular pyramidal shape, it is possible to preferentially use a scattering medium of a shape depending on an intended resonance state.

Further, in the information recording medium, preferably, a shape of the scattering medium may include a triangular prismatic shape. According to this configuration, since the shape of the scattering medium includes the triangular prismatic shape, it is possible to preferentially use a scattering medium of a shape depending on an intended resonance state.

Further, in the information recording medium, preferably, a shape of the scattering medium may include a conical shape. According to this configuration, since the shape of the scattering medium includes the conical shape, it is possible to preferentially use a scattering medium of a shape depending on an intended resonance state.

Further, in the information recording medium, preferably, the first mark, the second mark, and the third mark may include a metal layer. Accordingly to this configuration, since the first mark, the second mark, and the third mark include the metal layer, it is possible to preferentially use a metal of a kind depending on an intended resonance state.

Further, in the information recording medium, preferably, a shape of the first mark, the second mark, and the third mark may include a hemispherical shape or an elongated hemispherical shape. According to this configuration, it is possible to form the first mark, the second mark, and the third mark of the hemispherical shape or of the elongated hemispherical shape on the information recording medium.

Further, in the information recording medium, preferably, a shape of the first mark, the second mark, and the third mark may include a columnar shape or an elongated columnar shape. According to this configuration, it is possible to form the first mark, the second mark, and the third mark of the columnar shape or of the elongated columnar shape on the information recording medium.

A tracking method according to yet another aspect of the invention is a tracking method for use in an optical information apparatus configured to record or reproduce information to or from an information recording medium. The information recording medium is provided with a first mark disposed at a center of a track; a second mark disposed away from the center of the track in a tracking direction thereof by a predetermined distance b1, and disposed away from the first mark in a direction along the track by a predetermined distance L1; and a third mark disposed away from the center of the track in a tracking direction opposite to the tracking direction of the second mark by a predetermined distance b2, and disposed away from the first mark in the direction along the track by a predetermined distance L2. The second mark and the third mark generate scattered light depending on a distance between a scattering medium provided in the optical information apparatus, and each of the second mark and the third mark by irradiating the scattering medium with light. The predetermined distance b1 and the predetermined distance b2 are smaller than 50 nm. A difference between the predetermined distance L1 and the predetermined distance L2 is larger than a sum of a length of the first mark in the direction along the track, and a length of the second mark in the direction along the track. The tracking method includes a moving step of moving the scattering medium in the direction along the track at a predetermined relative velocity v; a detecting step of detecting that the scattering medium has passed the first mark; a first holding step of holding, as a first signal value, a value of a signal to be detected depending on the distance between the scattering medium and the second mark at a first point of time $t1=L1/v$ at which the scattering medium passes the second mark, after it is detected that the scattering medium has passed the first mark in the detecting step; a second holding step of holding, as a second signal value, a value of a signal to be detected depending on the distance between the scattering medium and the third mark at a second point of time $t2=L2/v$ at which the scattering medium passes the third mark, after it is detected that the scattering medium has passed the first mark in the detecting step; and a tracking signal calculating step of calculating a difference between the first signal value and the second signal value as a tracking signal.

According to the above configuration, the information recording medium is provided with the first mark disposed at the center of the track; the second mark disposed away from the center of the track in the tracking direction thereof by the predetermined distance b1, and disposed away from the first mark in the direction along the track by the predetermined distance L1; and the third mark disposed away from the center of the track in the tracking direction opposite to the tracking direction of the second mark by the predetermined distance b2, and disposed away from the first mark in the direction along the track by the predetermined distance L2. The second mark and the third mark generate scattered light depending on the distance between the scattering medium provided in the optical information apparatus, and each of the second mark and the third mark by irradiating the scattering medium with light. The predetermined distance b1 and the predetermined distance b2 are smaller than 50 nm. The difference between the predetermined distance L1 and the predetermined distance L2 is larger than the sum of the length of the first mark in the direction along the track, and the length of the second mark in the direction along the track. In the moving step, the scattering medium is moved in the direction along the track at the predetermined relative velocity v. In the detecting step, it is detected that the scattering medium has passed the first mark. In the first holding step, there is detected, as the first signal value, the value of the signal to be detected depending on the distance between the scattering medium and the second mark at the first point of time $t1=L1/v$ at which the scattering medium passes the second mark, after it is detected that the scattering medium has passed the first mark in the detecting step. In the second holding step, there is detected, as the second signal value, the value of the signal to be detected depending on the distance between the scattering medium and the third mark at the second point of time $t2=L2/v$ at which the scattering medium passes the third mark, after it is detected that the scattering medium has passed the first mark in the detecting step. In the tracking signal calculating step, there is calculated the difference between the first signal value and the second signal value as the tracking signal.

In the above configuration, the second mark and the third mark are disposed to be displaced away from each other in the tracking directions opposite to each other, and a tracking signal is generated based on the intensity of scattered light when the scattering medium comes close to the second mark, and based on the intensity of scattered light when the scattering medium comes close to the third mark. Accordingly, it is possible to stably perform tracking with respect to a track having a track pitch narrower than the diffraction limit of light.

An optical information apparatus according to yet another aspect of the invention is an optical information apparatus configured to record or reproduce information to or from an information recording medium. The information recording medium is provided with a first mark disposed at a center of a track; a second mark disposed away from the center of the track in a tracking direction thereof by a predetermined distance b1, and disposed away from the first mark in a direction along the track by a predetermined distance L1; and a third mark disposed away from the center of the track in a tracking direction opposite to the tracking direction of the second mark by a predetermined distance b2, and disposed away from the first mark in the direction along the track by a predetermined distance L2. The information recording medium is configured such that the second mark and the third mark generate scattered light depending on a distance between a scattering medium provided in the optical information apparatus, and each of the second mark and the third mark by irradiating the scattering medium with light, the predetermined distance b1 and the predetermined distance b2 are smaller than 50 nm, and a difference between the predetermined distance L1 and the predetermined distance L2 is larger than a sum of a length of the first mark in the direction along the track, and a length of the second mark in the direction along the track. The optical information apparatus includes a moving section which moves the scattering medium in the direction along the track at a predetermined relative velocity v; a detecting section which detects that the scattering medium has passed the first mark; a first holding section which holds, as a first signal value, a value of a signal to be detected depending on the distance between the scattering medium and the second mark at a first point of time t1=L1/v at which the scattering medium passes the second mark, after it is detected that the scattering medium has passed the first mark by the detecting section; a second holding section which holds, as a second signal value, a value of a signal to be detected depending on the distance between the scattering medium and the third mark at a second point of time t2=L2/v at which the scattering medium passes the third mark, after it is detected that the scattering medium has passed the first mark by the detecting section; and a tracking signal calculating section which calculates a difference between the first signal value and the second signal value as a tracking signal.

According to the above configuration, the information recording medium is provided with the first mark disposed at the center of the track; the second mark disposed away from the center of the track in the tracking direction thereof by the predetermined distance b1, and disposed away from the first mark in the direction along the track by the predetermined distance L1; and the third mark disposed away from the center of the track in the tracking direction opposite to the tracking direction of the second mark by the predetermined distance b2, and disposed away from the first mark in the direction along the track by the predetermined distance L2. The information recording medium is configured such that the second mark and the third mark generate scattered light depending on the distance between the scattering medium provided in the optical information apparatus, and each of the second mark and the third mark by irradiating the scattering medium with light. The predetermined distance b1 and the predetermined distance b2 are smaller than 50 nm. The difference between the predetermined distance L1 and the predetermined distance L2 is larger than the sum of the length of the first mark in the direction along the track, and the length of the second mark in the direction along the track. The moving section moves the scattering medium in the direction along the track at the predetermined relative velocity v. The detecting section detects that the scattering medium has passed the first mark. The first holding section holds, as the first signal value, the value of the signal to be detected depending on the distance between the scattering medium and the second mark at the first point of time t1=L1/v at which the scattering medium passes the second mark, after it is detected that the scattering medium has passed the first mark by the detecting section. The second holding section holds, as the second signal value, the value of the signal to be detected depending on the distance between the scattering medium and the third mark at the second point of time t2=L2/v at which the scattering medium passes the third mark, after it is detected that the scattering medium has passed the first mark by the detecting section. The tracking signal calculating section calculates the difference between the first signal value and the second signal value as the tracking signal.

In the above configuration, the second mark and the third mark are disposed to be displaced away from each other in the tracking directions opposite to each other, and a tracking signal is generated based on the intensity of scattered light when the scattering medium comes close to the second mark, and based on the intensity of scattered light when the scattering medium comes close to the third mark. Accordingly, it is possible to stably perform tracking with respect to a track having a track pitch narrower than the diffraction limit of light.

A tracking method according to yet another aspect of the invention is a tracking method for use in an optical information apparatus configured to record or reproduce information to or from an information recording medium. The information recording medium is provided with a first mark disposed at a center of a track; a second mark disposed to have an edge at a position away from the center of the track in a tracking direction thereof by a predetermined distance Δ; and a third mark disposed to have an edge at a position away from the center of the track in a tracking direction opposite to the tracking direction of the second mark by the predetermined distance Δ. A width of the second mark in the tracking direction thereof and a width of the third mark in the tracking direction thereof are larger than a track pitch. The second mark and the third mark generate scattered light depending on a distance between a scattering medium provided in an optical information apparatus, and the edge of each of the second mark and the third mark by irradiating the scattering medium with light. The predetermined distance Δ is smaller than 50 nm. The tracking method includes a moving step of moving the scattering medium in the direction along the track at a predetermined relative velocity v; a detecting step of detecting that the scattering medium has passed the first mark; a first holding step of holding, as a first signal value, a value of a signal to be detected depending on the distance between the scattering medium and the edge of the second mark at a first point of time t1=L1/v at which the scattering medium passes the edge of the second mark, after it is detected that the scattering medium has passed the first mark in the detecting step; a second holding step of holding, as a second signal value, a value of a signal to be detected depending on the distance between the scattering medium and the edge of the third mark at a second point of time t2=L2/v at which the scattering medium passes the edge of the third mark, after it is detected that the scattering medium has passed the first mark in the detecting step; and a tracking signal calculating step of calculating a difference between the first signal value and the second signal value as a tracking signal.

An optical information apparatus according to yet another aspect of the invention is an optical information apparatus configured to record or reproduce information to or from an information recording medium. The information recording medium is provided with a first mark disposed at a center of a track; a second mark disposed to have an edge at a position away from the center of the track in a tracking direction thereof by a predetermined distance Δ; and a third mark disposed to have an edge at a position away from the center of the track in a tracking direction opposite to the tracking direction of the second mark by the predetermined distance Δ. A width of the second mark in the tracking direction thereof and a width of the third mark in the tracking direction thereof are larger than a track pitch. The second mark and the third mark generate scattered light depending on a distance between a scattering medium provided in an optical information apparatus, and the edge of each of the second mark and the third mark by irradiating the scattering medium with light. The predetermined distance Δ is smaller than 50 nm. The optical information apparatus is provided with a moving section which moves the scattering medium in the direction along the track at a predetermined relative velocity v; a detecting section which detects that the scattering medium has passed the first mark; a first holding section which holds, as a first signal value, a value of a signal to be detected depending on the distance between the scattering medium and the edge of the second mark at a first point of time $t1=L1/v$ at which the scattering medium passes the edge of the second mark, after it is detected that the scattering medium has passed the first mark by the detecting section; a second holding section which holds, as a second signal value, a value of a signal to be detected depending on the distance between the scattering medium and the edge of the third mark at a second point of time $t2=L2/v$ at which the scattering medium passes the edge of the third mark, after it is detected that the scattering medium has passed the first mark by the detecting section; and a tracking signal calculating section which calculates a difference between the first signal value and the second signal value as a tracking signal.

A tracking method according to yet another aspect of the invention is a tracking method for use in an optical information apparatus configured to record or reproduce information to or from an information recording medium. The information recording medium is provided with recording marks each disposed at a center of a track and formed by self organization for recording information; and a guide mark configured to restrict a configuration of the recording marks so that the recording marks are disposed at respective predetermined positions in forming the recording marks by the self organization. The guide mark has a first bent portion for restricting the configuration of the self-organized recording marks on a data area side where the recording marks are disposed, and a second bent portion which makes a pair with the first bent portion on a side opposite to the data area side. The first bent portion is disposed at a position away from the center of the track in a tracking direction thereof by a predetermined distance Δ. The second bent portion is disposed at a position away from the center of the track in a tracking direction opposite to the tracking direction of the first bent portion by the predetermined distance Δ. The first bent portion and the second bent portion generate scattered light depending on a distance between a scattering medium provided in the optical information apparatus, and each of the first bent portion and the second bent portion by irradiating the scattering medium with light. The predetermined distance Δ is smaller than 50 nm. The tracking method includes a moving step of moving the scattering medium in the direction along the track at a predetermined relative velocity v; a first holding step of holding, as a first signal value, a value of a signal to be detected depending on the distance between the scattering medium and the first bent portion when the scattering medium passes the first bent portion; a second holding step of holding, as a second signal value, a value of a signal to be detected depending on the distance between the scattering medium and the second bent portion when the scattering medium passes the second bent portion; and a tracking signal calculating step of calculating a difference between the first signal value and the second signal value as a tracking signal.

An optical information apparatus according to yet another aspect of the invention is an optical information apparatus configured to record or reproduce information to or from an information recording medium. The information recording medium is provided with recording marks each disposed at a center of a track and formed by self organization for recording information; and a guide mark configured to restrict a configuration of the recording marks so that the recording marks are disposed at respective predetermined positions in forming the recording marks by the self organization. The guide mark has a first bent portion for restricting the configuration of the self-organized recording marks on a data area side where the recording marks are disposed, and a second bent portion which makes a pair with the first bent portion on a side opposite to the data area side. The first bent portion is disposed at a position away from the center of the track in a tracking direction thereof by a predetermined distance Δ. The second bent portion is disposed at a position away from the center of the track in a tracking direction opposite to the tracking direction of the first bent portion by the predetermined distance Δ. The first bent portion and the second bent portion generate scattered light depending on a distance between a scattering medium provided in the optical information apparatus, and each of the first bent portion and the second bent portion by irradiating the scattering medium with light. The predetermined distance Δ is smaller than 50 nm. The optical information apparatus is provided with a moving section which moves the scattering medium in the direction along the track at a predetermined relative velocity v; a first holding section which holds, as a first signal value, a value of a signal to be detected depending on the distance between the scattering medium and the first bent portion when the scattering medium passes the first bent portion; a second holding section which holds, as a second signal value, a value of a signal to be detected depending on the distance between the scattering medium and the second bent portion when the scattering medium passes the second bent portion; and a tracking signal calculating section which calculates a difference between the first signal value and the second signal value as a tracking signal.

A tracking method according to yet another aspect of the invention is a tracking method for use in an optical information apparatus configured to record or reproduce information to or from an information recording medium. The information recording medium is provided with a first mark disposed at a center of a track; a plurality of second marks disposed away from the center of the track in a tracking direction thereof by a predetermined distance b1, and disposed in a direction along the track at a predetermined interval; and a plurality of third marks disposed away from the center of the track in a tracking direction opposite to the tracking direction of the second marks by a predetermined distance b2, and disposed in the direction along the track at a same interval as the interval of the second marks. The second marks and the third marks generate scattered light depending on a distance between a scattering medium provided in the optical information apparatus, and each of the second marks and the third marks by irradiating the scattering medium with light. The predetermined distance b1 and the predetermined distance b2 are smaller than 50 nm. The tracking method includes a moving step of moving the scattering medium in the direction along the track at a predetermined relative velocity v; a detecting step of detecting that the scattering medium has passed the first mark; a first holding step of holding, as a first signal value, a value of a signal to be detected depending on the distance between the scattering medium and the plurality of the second marks when the scattering medium passes the second marks, after it is detected that the scattering medium has passed the first mark in the detecting step; a second holding step of holding, as a second signal value, a value of a signal to be detected depending on the distance between the scattering medium and the plurality of the third marks when the scattering medium passes the third marks, after it is detected that the scattering medium has passed the first mark in the detecting step; and a tracking signal calculating step of calculating a difference between the first signal value and the second signal value as a tracking signal.

An optical information apparatus according to still another aspect of the invention is an optical information apparatus configured to record or reproduce information to or from an information recording medium. The information recording medium is provided with a first mark disposed at a center of a track; a plurality of second marks disposed away from the center of the track in a tracking direction thereof by a predetermined distance b1, and disposed in a direction along the track at a predetermined interval; and a plurality of third marks disposed away from the center of the track in a tracking direction opposite to the tracking direction of the second marks by a predetermined distance b2, and disposed in the direction along the track at a same interval as the interval of the second marks. The second marks and the third marks generate scattered light depending on a distance between a scattering medium provided in the optical information apparatus, and each of the second marks and the third marks by irradiating the scattering medium with light. The predetermined distance b1 and the predetermined distance b2 are smaller than 50 nm. The optical information apparatus is provided with a moving section which moves the scattering medium in the direction along the track at a predetermined relative velocity v; a detecting section which detects that the scattering medium has passed the first mark; a first holding section which holds, as a first signal value, a value of a signal to be detected depending on the distance between the scattering medium and the plurality of the second marks when the scattering medium passes the second marks, after it is detected that the scattering medium has passed the first mark by the detecting section; a second holding section which holds, as a second signal value, a value of a signal to be detected depending on the distance between the scattering medium and the plurality of the third marks at a second point of time $t2=L2/v$ at which the scattering medium passes the third marks, after it is detected that the scattering medium has passed the first mark by the detecting section; and a tracking signal calculating section which calculates a difference between the first signal value and the second signal value as a tracking signal.

The embodiments or the examples described in the detailed description of the invention are provided to clarify the technical contents of the invention. The invention should not be construed to be limited to the embodiments or the examples. The invention may be modified in various ways as far as such modifications do not depart from the spirit and the scope of the invention hereinafter defined.

INDUSTRIAL APPLICABILITY

The information recording media, the tracking method, and the optical information apparatus of the invention are capable of stably performing tracking with respect to a track having a track pitch narrower than the diffraction limit of light, and are useful as high-density information recording media, high-density memories, or high-density video recording media, for instance. Further, the information recording media, the tracking method, and the optical information apparatus of the invention are also applicable to scanning and positioning in probe microscopy, for instance.

The invention claimed is:

1. An information recording medium, comprising:
   a first mark disposed at a center of a track;
   a second mark disposed to have an edge at a position away from the center of the track in a tracking direction thereof by a predetermined distance $\Delta$; and
   a third mark disposed to have an edge at a position away from the center of the track in a tracking direction opposite to the tracking direction of the second mark by the predetermined distance $\Delta$, wherein
   a width of the second mark in the tracking direction thereof and a width of the third mark in the tracking direction thereof are larger than a track pitch,
   the second mark and the third mark generate scattered light depending on a distance between a scattering medium provided in an optical information apparatus, and each of the second mark and the third mark by irradiating the scattering medium with light, and
   the predetermined distance $\Delta$ is smaller than 50 nm,
   each of the second mark and the third mark is formed over a plurality of tracks,
   one of the edges of the second mark in the tracking direction, and the other of the edges of the second mark in the tracking direction are respectively away from the centers of the tracks different from each other in the respective tracking directions by the predetermined distance $\Delta$, and
   one of the edges of the third mark in the tracking direction, and the other of the edges of the third mark in the tracking direction are respectively away from the centers of the tracks different from each other in the respective tracking directions by the predetermined distance $\Delta$.

2. The information recording medium according to claim 1, wherein
   the second mark and the third mark are classified into different groups depending on a distance thereof from the first mark, and
   the second mark and the third mark belonging to a same group are repeatedly disposed at a predetermined interval.

3. The information recording medium according to claim 1, further comprising:
   recording marks formed by self organization for recording information.

4. The information recording medium according to claim 1, wherein
   the second mark or the third mark sets out the recording marks in forming the recording marks by the self organization for restricting a configuration of the recording marks.

5. The information recording medium according to claim 1, wherein
   the scattering medium is made of a metal.

6. The information recording medium according to claim 1, wherein
   a shape of the scattering medium includes a spherical shape.

7. The information recording medium according to claim 1, wherein
   a shape of the scattering medium includes a columnar shape.

8. The information recording medium according to claim 1, wherein
a shape of the scattering medium includes a triangular pyramidal shape.

9. The information recording medium according to claim 1, wherein
a shape of the scattering medium includes a triangular prismatic shape.

10. The information recording medium according to claim 1, wherein
a shape of the scattering medium includes a conical shape.

11. An information recording medium, comprising:
recording marks each disposed at a center of a track and formed by self organization for recording information; and
a guide mark configured to restrict a configuration of the recording marks so that the recording marks are disposed at respective predetermined positions in forming the recording marks by the self organization, wherein
the guide mark has a first bent portion for restricting the configuration of the self-organized recording marks on a data area side where the recording marks are disposed, and a second bent portion which makes a pair with the first bent portion on a side opposite to the data area side,
the first bent portion is disposed at a position away from the center of the track in a tracking direction thereof by a predetermined distance $\Delta$,
the second bent portion is disposed at a position away from the center of the track in a tracking direction opposite to the tracking direction of the first bent portion by the predetermined distance $\Delta$,
the first bent portion and the second bent portion generate scattered light depending on a distance between a scattering medium provided in an optical information apparatus, and each of the first bent portion and the second bent portion by irradiating the scattering medium with light, and
the predetermined distance $\Delta$ is smaller than 50 nm,
the guide mark includes a first guide mark, and a second guide mark disposed in juxtaposition with the first guide mark in a direction along the track,
the first bent portion of the first guide mark and the first bent portion of the second guide mark are disposed away from each other by a distance corresponding to a track pitch, and
the second bent portion of the first guide mark and the second bent portion of the second guide mark are disposed away from each other by a distance corresponding to the track pitch.

12. An information recording medium, comprising:
a first mark disposed at a center of a track;
a plurality of second marks disposed away from the center of the track in a tracking direction thereof by a predetermined distance b1, and disposed in series in a direction along the track at a predetermined interval capable of detecting an amplitude of an AC signal; and
a plurality of third marks disposed away from the center of the track in a tracking direction opposite to the tracking direction of the second marks by a predetermined distance b2, and disposed in series in the direction along the track at a same interval as the interval of the second marks, wherein
the second marks and the third marks generate scattered light depending on a distance between a scattering medium provided in an optical information apparatus, and each of the second marks and the third marks by irradiating the scattering medium with light, and
the predetermined distance b1 and the predetermined distance b2 are smaller than 50 nm.

13. A tracking method for use in an optical information apparatus configured to record or reproduce information to or from an information recording medium,
the information recording medium being provided with:
a first mark disposed at a center of a track;
a second mark disposed to have an edge at a position away from the center of the track in a tracking direction thereof by a predetermined distance $\Delta$; and
a third mark disposed to have an edge at a position away from the center of the track in a tracking direction opposite to the tracking direction of the second mark by the predetermined distance $\Delta$,
the information recording medium being configured such that a width of the second mark in the tracking direction thereof and a width of the third mark in the tracking direction thereof are larger than a track pitch,
the second mark and the third mark generate scattered light depending on a distance between a scattering medium provided in the optical information apparatus, and the edge of each of the second mark and the third mark by irradiating the scattering medium with light,
the predetermined distance $\Delta$ is smaller than 50 nm,
each of the second mark and the third mark is formed over a plurality of tracks,
one of the edges of the second mark in the tracking direction, and the other of the edges of the second mark in the tracking direction are respectively away from the centers of the tracks different from each other in the tracking directions opposite to each other by the predetermined distance $\Delta$, and
one of the edges of the third mark in the tracking direction, and the other of the edges of the third mark in the tracking direction are respectively away from the centers of the tracks different from each other in the tracking directions opposite to each other by the predetermined distance $\Delta$,
the tracking method comprising:
a moving step of moving the scattering medium in the direction along the track at a predetermined relative velocity v;
a detecting step of detecting that the scattering medium has passed the first mark;
a first holding step of holding, as a first signal value, a value of a signal to be detected depending on the distance between the scattering medium and the second mark at a first point of time $t1=L1/v$ at which the scattering medium passes the second mark, after it is detected that the scattering medium has passed the first mark in the detecting step;
a second holding step of holding, as a second signal value, a value of a signal to be detected depending on the distance between the scattering medium and the third mark at a second point of time $t2=L2/v$ at which the scattering medium passes the third mark, after it is detected that the scattering medium has passed the first mark in the detecting step; and
a tracking signal calculating step of calculating a difference between the first signal value and the second signal value as a tracking signal.

14. An optical information apparatus configured to record or reproduce information to or from an information recording medium,
the information recording medium being provided with:
a first mark disposed at a center of a track;

a second mark disposed to have an edge at a position away from the center of the track in a tracking direction thereof by a predetermined distance $\Delta$; and a third mark disposed to have an edge at a position away from the center of the track in a tracking direction opposite to the tracking direction of the second mark by the predetermined distance $\Delta$, the information recording medium being configured such that a width of the second mark in the tracking direction thereof and a width of the third mark in the tracking direction thereof are larger than a track pitch, the second mark and the third mark generate scattered light depending on a distance between a scattering medium provided in the optical information apparatus, and the edge of each of the second mark and the third mark by irradiating the scattering medium with light, the predetermined distance $\Delta$ is smaller than 50 nm, each of the second mark and the third mark is formed over a plurality of tracks, one of the edges of the second mark in the tracking direction, and the other of the edges of the second mark in the tracking direction are respectively away from the centers of the tracks different from each other in the tracking directions opposite to each other by the predetermined distance $\Delta$, and one of the edges of the third mark in the tracking direction, and the other of the edges of the third mark in the tracking direction are respectively away from the centers of the tracks different from each other in the tracking directions opposite to each other by the predetermined distance $\Delta$, the optical information apparatus comprising:

a moving section which moves the scattering medium in the direction along the track at a predetermined relative velocity v;

a detecting section which detects that the scattering medium has passed the first mark;

a first holding section which holds, as a first signal value, a value of a signal to be detected depending on the distance between the scattering medium and the second mark at a first point of time $t1=L1/v$ at which the scattering medium passes the second mark, after it is detected that the scattering medium has passed the first mark by the detecting section;

a second holding section which holds, as a second signal value, a value of a signal to be detected depending on the distance between the scattering medium and the third mark at a second point of time $t2=L2/v$ at which the scattering medium passes the third mark, after it is detected that the scattering medium has passed the first mark by the detecting section; and a tracking signal calculating section which calculates a difference between the first signal value and the second signal value as a tracking signal.

* * * * *